United States Patent [19]

Williams et al.

[11] 4,268,426
[45] May 19, 1981

[54] WATER-DISPERSIBLE URETHANE POLYMERS, AQUEOUS POLYMER DISPERSIONS AND HALF-ESTERS USEFUL THEREIN

[75] Inventors: Roy C. Williams, East Amherst; David R. Rogemoser, Tonawanda, both of N.Y.

[73] Assignee: Textron, Inc., Providence, R.I.

[21] Appl. No.: 44,674

[22] Filed: Jun. 1, 1979

Related U.S. Application Data

[63] Continuation-in-part of Ser. No. 36,506, May 7, 1979, abandoned.

[51] Int. Cl.³ .................. C08G 18/48; C09D 3/72
[52] U.S. Cl. .................. 260/22 TN; 260/18 TN; 260/29.2 TN; 260/45.7 PH; 528/75; 528/80; 528/81
[58] Field of Search ..... 260/22 TN, 18 TN, 29.2 TN, 260/45.7 PH; 528/81, 75, 80

[56] References Cited

U.S. PATENT DOCUMENTS

| | | | |
|---|---|---|---|
| 3,318,828 | 5/1967 | Seiner | 528/81 |
| 3,412,054 | 11/1968 | Milligan et al. | 260/18 |
| 3,458,260 | 7/1969 | Owens | 356/115 |
| 3,479,310 | 11/1969 | Dietrich et al. | 260/29.2 TN |
| 3,640,924 | 2/1972 | Hermann et al. | 528/49 |
| 3,736,216 | 5/1973 | Hermann et al. | 161/62 |
| 3,748,294 | 7/1973 | Kershaw | 260/22 TN |
| 3,759,873 | 9/1973 | Hudak | 260/18 TN |
| 3,868,350 | 2/1975 | Reiff et al. | 260/77.5 Q |
| 3,870,684 | 3/1975 | Witt | 260/75 NH |
| 3,882,189 | 5/1975 | Hudak | 260/18 TN |
| 3,983,058 | 9/1976 | Hirooka et al. | 260/18 TN |
| 3,988,278 | 10/1976 | Bartizal | 260/18 TN |
| 3,996,172 | 12/1976 | Olstowski | 260/18 TN |
| 4,046,729 | 9/1977 | Seriven et al. | 260/29.2 TN |
| 4,066,591 | 1/1978 | Seriven et al. | 260/29.2 TN |
| 4,094,838 | 6/1978 | Schneider et al. | 260/18 TN |
| 4,111,861 | 9/1978 | Godlewski | 521/123 |
| 4,150,206 | 4/1979 | Jourquin | 521/51 |
| 4,163,094 | 7/1979 | Turpin | 528/45 |
| 4,172,191 | 10/1979 | Nachtkamp et al. | 260/29.2 TN |

FOREIGN PATENT DOCUMENTS 953673  3/1964  United Kingdom .......... 260/18 TN

*Primary Examiner*—Ronald W. Griffin
*Attorney, Agent, or Firm*—Bernard & Brown

[57] ABSTRACT

Aqueous dispersions of oil-modified, carboxyl-containing, urethane polymers are prepared by reacting diisocyanates or their isocyanate-terminated prepolymers, with half-esters of hindered diols, especially 2,2,4-trimethyl-1,3-pentanediol, and anhydrides of polycarboxylic acids, preferably aromatic acids having at least three carboxylic groups, especially trimellitic anhydride. The urethane polymers are "oil-modified", i.e., extended with unsaturated fatty acid esterpolyols; and when neutralized with ammonia or amines can be dispersed in water to form especially desirable coating compositions. An organic phosphite may be incorporated in the compositions to control the development of hardness in films made from the aqueous dispersions and thereby avoid the formation of wrinkles in films that are made from the compositions.

64 Claims, No Drawings

WATER-DISPERSIBLE URETHANE POLYMERS, AQUEOUS POLYMER DISPERSIONS AND HALF-ESTERS USEFUL THEREIN

This is a continuation-in-part of our patent application Ser. No. 036,506, filed May 7, 1979, now abandoned.

The present invention relates to "oil-modified" urethane polymers, and to their aqueous dispersions which are suitable for use as coating compositions. The invention also relates to polyol-anhydride half-ester materials that can be used to prepare the urethane polymers, and to the use of an organic phosphite, preferably a tris-phenyl phosphite, to control the development of hardness in films made from the aqueous dispersions and thereby avoid the formation of wrinkles in films that are made from the urethane polymers.

Urethane polymers have found widespread use in coatings for fabrics, plastics, wood, metal, and the like, due to their advantageous properties such as their good chemical-resistance, abrasion-resistance, toughness, elasticity and durability, and their ability to cure rapidly. Conventionally, polymeric urethane coatings have been applied as solutions in, for instance, polar or aromatic hydrocarbon solvents. When the urethanes are of certain types, they may be compatible with aliphatic hydrocarbon solvents. While the coating is being dried, or cured, these solvents vaporize into the atmosphere.

Oil-modified, organic solvent-based, urethane compositions have been traditionally used as clear or pigmented air-drying, varnish-type coatings. These compositions are particularly used where high levels of hardness and abrasion resistance and quick-drying capabilities are needed such as on floors or other objects subjected to wear. These properties are characteristics of the urethane components of the polymer while the air-drying capability is supplied by the oil portion, and these factors are generally balanced to give optimum properties. Sometimes alkyd resins, such as those prepared from phthalic anhydride oils and polyols, are physically or chemically incorporated in the compositions to lower cost or modify the products to develop particular performance properties. The resins may contain aliphtic hydrocarbon solvents to reduce viscosity and driers to accelerate auto-oxidation. When the coatings dry the solvent vaporized is an economic loss and, quite importantly, the vaporous solvent may pollute the atmosphere.

Aqueous, polyurethane coating compositions are, therefore, particularly desirable due to the low cost and availability of water. Moreover, aqueous coating compositions are advantageous since the evaporation of water into the atmosphere has little, if any, adverse effect on the environment whereas conventionally employed organic solvents may be toxic, odoriferous, or photochemically-sensitive, and thus, may be smog-formers in the daylight atmosphere due to photochemical oxidation. Furthermore, water which is readily available can be used to thin the water-based coating compositions and can be used in clean-up operations. However, urethanes generally are not compatible with water unless special ingredients and/or particular steps of manufacture are employed in their synthesis.

One approach to provide water-dispersible, polyurethane-containing compositions has been through the use of emulsifiers. This procedure generally suffers from the disadvantages that the dispersions are relatively unstable and the resultant films are water-sensitive.

Another way to prepare water-dilutable urethane coatings and thereby reduce or eliminate the organic solvent content is to make ammonium-neutralized, polyelectrolyte salts of the polymers. The presence of alcoholic cosolvents may be helpful in making the aqueous dispersion. Thus, when the ammonia or amine of the ammonium salt evaporates on drying, the salt deionizes and becomes water-insoluble. The film left behind from the dispersion then auto-oxidizes to a tough, water-resistant coating. In order to form the polyelectrolyte salts, pendant carboxylic groups may be introduced along the polymer chains of the oil-modified urethane polymer.

Introducing carboxylic groups into urethane polymers may be a difficult procedure due to the reactivity of these groups with the diisocyanate monomers or isocyanate-terminated prepolymers used to build the polymer chains. This reactivity can lead to reductions in the carboxylic group content of the product and formation of undesirable side products. Thus, the normal sources of carboxylic groups used in the preparation of alkyd resins can often not be effectively used to make the polymers. One must then inject the carboxylic group source after the isocyanate has reacted with the hydroxyl groups to form the urethane, or choose a special source of carboxylic groups that are unreactive with isocyanates at the temperatures used to form the polymers. Introducing the carboxylic group source after the reaction of the isocyanate groups is generally not practical due to the heat sensitivity and resulting discoloration of the urethane polymer. Even the lower temperatures, e.g., 250° F.–300° F., at which half-ester formation proceeds from acid anhydrides to leave carboxylic groups can be detrimental.

Proposals for incorporating carboxylic groups into urethane polymer structures in order for the groups to be neutralized to form suitable salt groups and thereby impart a degree of water-dispersibility to the urethane polymer, are evident in U.S. Pat. Nos. 3,412,054; 3,479,310; and 3,870,684. Carboxylic groups in urethane polymers can result, however, in increased moisture sensitivity in the coatings or films formed from dispersions of such polymers. Aqueous polyurethane dispersions such as those exemplified in U.S. Pat. No. 3,412,054 in which a drying oil component is present in the initially-formed polyurethane are notably deficient in drying rate.

The use of dimethylol propionic acid (DMPA) which has a tertiary carboxylic group having low reactivity with isocyanate groups is described in U.S. Pat. No. 3,412,054 to prepare water-dispersible urethanes. In the procedure of the patent the DMPA in the presence of other polyols, if desired, is first reacted with fatty acids to make the DMPA compatible for reaction with the diisocyanate. The DMPA ester is then reacted with the diisocyanate to form the polymer, but this procedure gives inferior products. Alternatively, the patent describes the preparation of a polymer of TDI and DMPA in solvent, but nothing further is done with the polymer. These procedures do not give a suitable polymer for use in varnish-type coatings. The poor results are apparently because mixtures of the reactants are incompatible when the organic polyol is an oil-polyol alcoholysis product, and will not react. The present invention overcomes these difficulties.

Other efforts have also been made to improve the properties of coatings made with aqueous dispersions of urethane polymers. One procedure has been to incorporate into the urethane polymer structure, fatty acid-containing moieties derived, for example, from drying or semi-drying oils, to increase the hydrophobic properties of the resulting urethane polymer films. U.S. Pat. Nos. 4,046,729; and 4,066,591 disclose polymer modifications of this type. To the extent that these patents are concerned with the use of unsaturated polyesters, the latter are united as part of an isocyanate-terminated prepolymer. The efforts in the prior art to make aqueous dispersions of oil-modified polyurethanes have been successful to varying extents, although at least for the most part the resulting dispersions or coatings have significant shortcomings when compared with those made from organic solvent-based polymer compositions.

Given the interest in providing convenient, pollution-free, low-cost, film-forming coating products, there is a continuing need for development of urthene polymer materials that can be employed to make clear, stable compositions containing water as the principal solvent or dispersing medium, but which nonetheless provide films or coatings that have, for instance, good water-resistance, abrasion-resistance and flexibility. In accordance with the present invention there are provided stable, essentially aqueous dispersions of "oil-modified" urethane polymers in ammonium salt form. The aqueous dispersions are relatively clear and stable, and may be in essentially colloidal form. Coatings made with the dispersions exhibit the properties of organic solvent-based, oil-modified polyurethanes, and have a good balance of properties in terms of, for example, drying rate, hardness and flexibility to embody the coating with resistance to cracking at low temperatures.

The present invention provides stable, aqueous dispersions of "oil-modified" urethane polymers that can be diluted with water to a viscosity or non-volatile content suitable for application to a substrate as a coating. The dispersions contain polymer solids that are essentially colloidal in size, and the dispersions are relatively clear as compared with urethane emulsions or latexes. The appearance of the dispersions can be from slightly opaque to relatively clear, and may approach, if not reach, the appearance of a solution. The rheological properties of the dispersions may resemble those of a true solution. Even though the oil-modified urethane polymer dispersions of this invention can be greatly diluted with water, when films of these compositions are cured they have good resistance to water. The oil-modified urethane polymers can be fully polymerized such that no further urethane or urea-forming reactions need occur during curing. The films can oxidatively cure at room temperature, and thus may be described as low energy-consuming materials. The aqueous dispersions can be relatively non-polluting since only relatively minor amounts of volatile organic material need be present in the aqueous dispersions. The aqueous dispersions of this invention can have a generally neutral pH, thus a wide selection of pigments can be used without having compatibility problems in the dispersion, and the polymers need not be subjected to high pH conditions which may otherwise tend to promote hydrolysis of the polymer chain. Such aqueous dispersions further possess acceptable viscosity and storage stability characteristics so as to be particularly useful as coating compositions.

By the present invention reactive intermediates have been found that allow introduction of pendant carboxylic groups in an oil-modified urethane polymer without significant undesirable side reactions. These materials are essentially half-esters of anhydrides of polycarboxylic acids and structurally-hindered diols, especially 2,2,4-trimethyl-1,3-pentanediol (TMPD). The intermediates are useful because the anhydride selectively reacts with the less hindered hydroxyl of the diol. Thus, the half-ester molecules have a hydroxyl group that can react into the oil-modified urethane polymer at relatively low temperatures at which the carboxylic groups in essence do not react with the isocyanate groups present.

The hindered diols that are employed in this invention are branch-chained and have in a given molecular hydroxyl groups of different types and different reaction rates with isocyanate groups. Thus, one hydroxyl group may be primary with the other secondary or tertiary, or one hydroxyl group may be secondary with the other tertiary. Although these hydroxyl groups have different reactivities, the difference is generally not sufficient in the case of many primary-secondary diols to form half-esters on an adequately selective basis to provide the half-ester products of the invention. It has been found that if the difference in reactivity of the hydroxyl groups of the primary-secondary diols is increased by the secondary hydroxy group being positioned on a carbon atom that is attached to at least one tertiary or quaternary carbon atom, the difference can be sufficient for the desired reaction of the primary hydroxyl group to proceed with comparatively little, if any, reaction of the secondary hydroxyl group.

The hydroxyl groups of the hindered diols are attached to separate aliphatic carbon atoms which are both in a given acyclic or alicyclic structure. Thus, the hydroxy groups are aliphatic and generally the diols are essentially aliphatic in structure, although some non-aliphatic structure or non-hydrocarbonaceous constituent may be present, unless it unduly interferes with the desired reaction. The diols may thus contain non-interfering substituents, e.g., alkyl groups, preferably lower alkyl, of say 1 to about 6 carbon atoms, and may be unsaturated but are preferably saturated. Generally, the diols have at least about 5 carbon atoms per molecule, and there may be little, if any, reason for the diols to contain more than about 10 to 12 or 18 carbon atoms per molecule. Thus, the diol may be, for example 2,4,4-trimethyl-1,3-pentanediol; 2-ethyl-1,3-hexanediol; 2-methyl-2,4-pentanediol; and the like.

With other polyols, the anhydrides do not form half-esters on an essentially one-to-one basis. Rather, a statistical distribution of reaction products develops which reduces the amount of carboxylic group that can be incorporated into the oil-modified urethane polymer. For example, if an equimolar mixture of trimellitic anhydride (TMA) and 1,6-hexanediol be reacted, the following approximate mixture results: 25% of the 1,6-hexanediol would have no TMA reacted, 50% of the 1,6-hexanediol would have 1 TMA molecule reacted with it, and 25% of the 1,6-hexanediol would have 2 TMA molecules attached. This latter species would not have hydroxyl groups to react into the polymer, and thus half of the total carboxylic groups would not be part of the polymer and, rather, would be of little, if any, value for water dispersibility purposes. This would mean that approximately twice as much intermediate or carboxylic group content could be needed to reach a given level of resin water-dispersibility, and this would negatively affect coating films, water-resistance and other physical properties. This general principle applies in varying extents to other polyol reactants such as glycerine, trimethylolpropane, propylene glycol, and the like, as evidenced by their giving products having poor water-dispersibility.

While the dihydroxy alkanoic acids such as DMPA can be employed in water-dispersible, oil-modified urethanes, there is difficulty in their use since the urethane products do not exhibit as high an acid value (AV) or carboxylic group content as desired. This is because an inert, e.g., non-alcoholic, solvent is generally advisable to reduce viscosity during the polymerization reactions. The inert solvents do not contribute as much to improved water-dispersibility as the alcoholic or other coupling solvents. Thus, to get good dispersibility at lower acid values of the order of about 35 to 40 with DMPA-derived urethane polymers, the inert solvent is distilled off and replaced with a good cosolvent to meet the low solvent standards mandated by air pollution controls. This is an uneconomical, and perhaps impractical, industrial process for many resin manufacturers.

At higher resin acid values of the order of say about 50–70, that can be obtained with, for instance, dihydroxy alkanoic acid-TMPD half-ester intermediates of the present invention, more of the inert solvent can be tolerated and the distillation can be avoided. Trying to prepare such higher acid value polymers by using increased DMPA reactant without employing the half-ester material leads to considerable reduction in the oil content of the products making their coatings too brittle, or alternatively leads to very low molecular weight polymers which air-dry poorly. By the present invention it has also been found that by the use of substantial amounts of the anhydride half-ester intermediates the acid value of urethane polymers that contain DMPA can be raised to the needed levels without loss of the desired coating performance.

Forming the basis of the aqueous products of the invention are oil-modified urethane polymers which are the reaction products of diisocyanates or their isocyanate-terminated prepolymers, and urethane-forming materials that comprise the half-ester reaction products of the hindered diols and anhydrides of polycarboxylic acids. Urethane polymers embodying these half-ester reaction products are especially suited for oil-modification, i.e., chain extension, with unsaturated fatty acid esterpolyols, and the resulting products contain sufficient carboxylic groups to provide when in ammonium salt form, the requisite water-dispersibility characteristics. The oil-modified, water-dispersible urethane polymers thus contain pendant carboxylic acid groups available for quaternary ammonium salt formation by neutralization with ammonia or amines. The development of hardness in films made from the aqueous dispersions can be desirably controlled by the inclusion in the compositions of a small, but effective, amount of an organic phosphite.

The essential anhydride/diol half-ester component employed in forming the urethane polymers used in this invention is made in the absence of any significant amount of isocyanate group-containing material and has at least one carboxylic acid group

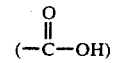

or carboxylate ion group

per molecule which is relatively non-reactive with isocyanates. Both the carboxylic acid group and carboxylate ion group are referred to herein as carboxylic groups. Thus, the isocyanate groups of the diisocyanate or its prepolymer react preferentially with the hydroxyl groups of the half-ester molecules to provide a polymer structure with pendant carboxylic groups available for quaternary salt formation, even after inclusion in the polymer of significant fractions of the total amount of the oil-modifying, unsaturated fatty acid ester polyol component employed in the composition. Pendant carboxylic groups may also be provided in the polymer by inclusion of other carboxylic group-containing polyols such as dihydroxy alkanoic acids.

The carboxylic groups of the polymer are neutralized with ammonia or amines to form ammonium salts in an amount which enhances the water-dispersibility of the urethane polymers formed in accordance with this invention. The increase in water-dispersibility thereby provided is most advantageously sufficient for the ammonia or amine-neutralized polymer to be infinitely-dilutable or nearly so with water, and the amount is adequate for the ammonia or amine-neutralized, polymer to be in the form of a stable, colloidal dispersion. Thus, in the aqueous dispersion the amount of ionized carboxylic group

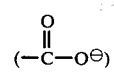

available from the neutralized carboxylic groups in salt form is generally at least about 3, e.g., about 3 to 6, weight percent of the neutralized, urethane polymer on a non-solvent, non-aqueous basis, i.e., solids basis, preferably about 4 to 5 weight percent. For example, the amount of carboxylic group-containing materials reacted may provide unneutralized, polymer solids having an acid value of at least about 35 or 40 preferably about 55 to 75, on a solids basis. Generally, as the acid value of the unneutralized, polymer solids increases the long term stability of the aqueous dispersions increases upon salt formation. Lowering of the acid value of the polymer solids may give products that in salt form have improved film performance. Of the total amount of carboxylic groups in the polymer molecules, a substantial portion is supplied by the carboxylic groups from the anhydride employed to form the half-ester reaction products of this invention. Generally, this amount is at least about 20, preferably about 30 to 100, percent of the total carboxylic groups in the polymer dispersed in the aqueous medium.

The carboxylic group-containing polymers of the present invention are oil-modified, that is, they contain unsaturated fatty acid esterpolyol moieties in the polymer structure. Part or all of the oil-modifying component may be included in the polymer at various times in its preparation. Thus, the oil modifier can be included as part of a diisocyanate prepolymer, and, if desired, other reactants such as the diol half-ester can be included in the prepolymer or subsequently reacted therewith. In these embodiments at least part of the fatty acid ester-polyol or oil-modifier is reacted into the polymer structure along with, or as part of the isocyanate reactant, although in a preferred embodiment at least the major portion of the oil-modifier is reacted after the isocyanate component has reacted with the diol half-ester. Additional polyol, e.g. glycol, triol, or other polyol, e.g. trimethylol propane (TMP), hindered diol or dihydroxy alkanoic acids, or other material reactive with hydroxyl groups or isocyanate groups, may be included as a reactant at various stages of product manufacture. One or more of these additional ingredients may provide a substantial portion of the hydroxy functionality reacted and may even be, for example, a major portion of total polyol reacted with the polyisocyanate on a hydroxyl functionality basis. For example, TMP has been included in a TMPD half-ester, and TMPD has been employed as a reactant after the isocyanate and oil-modifiers have reacted with the TMPD half-ester. The amount of materials other than the unsaturated fatty acid esterpolyols is not so great that the latter component does not provide a substantial portion, say, at least about 10 or 20 weight %, of the total polymer solids.

As noted above, the isocyanate reactant may be used in various prepolymer forms made by reaction of diisocyanate with a polyfunctional material having groups that are reactive with isocyanate groups. These polyfunctional materials may contain various isocyanate-reactive groups such as hydroxyl, amine or the like. Aside from the diol half-ester, other carboxylic group-supplying reactants may be used to provide additional salt-forming carboxylic groups. Thus, the half-ester, with or without a minor amount of oil-modifier, can be reacted with a diisocyanate, and additional carboxylic group-containing polyol, e.g. alpha, alpha-dimethylol propionic acid, to form an isocyanate-terminated prepolymer. It is, therefore, apparent that the essential materials i.e., the diol half-ester and the oil-modifier, can be reacted, with or without other polyols or other isocyanate-reactive materials, with the diisocyanate in various desired orders and as mixtures. Of the total isocyanate-reactive materials the hindered diol component of the half-ester generally supplies a substantial amount, for instance, at least about 5%, of the isocyanate-reactive functionality which includes hydroxyl groups, preferably about 10 to 40%, while the oil-modifier provides at least about 10%, preferably about 40 to 80%. As noted herein, additional polyols or other materials reactive with isocyanate group may also be employed to provide any remaining isocyanate-reactive functionality desired. The products of the invention made in various ways do not necessarily exhibit the same extents of advantageous properties as well be apparent from the specific examples and data presented hereinafter.

The carboxylic group-containing half-ester which is an essential component of the urethane-forming components herein is the half-ester reaction product of one of more of the hindered diols and an anhydride of a polycarboxylic acid. The anhydride may be aliphatic in structure in which case those of about 4 to 5 carbon atoms such as succinic and glutaric anhydrides are available. The anhydrides are preferably of aromatic acids having at least three carboxylic groups per molecule. The reaction products have been found to be useful in forming acceptable urethane polymers which can be oil-modified by introduction of unsaturated fatty acid moieties into the polymer structure, and which contain sufficient carboxylic groups to provide upon neutralization, a high degree of water-dispersibility of the polymer. The use of trimellitic acid anhydride is highly preferred. Similar carboxylic group-containing esters such as those prepared from phthalic or isophthalic acid, or even trimellitic acid, provide polymers with unacceptably low, free carboxyl contents by virtue of the reaction of carboxyl groups with isocyanate groups. Half-esters of aromatic anhydrides and glycols and triols other than the hindered diol, when reacted with diisocyanate and oil-modifying polyol esters, also provide inferior polymers in terms of either polymer viscosity or polymer carboxyl content. The diol half-esters of the present invention are believed to have stereochemical configurations that make them especially useful in forming urethane polymers having the requisite carboxyl content for water dispersibility and which are appropriately reactive with oil-modifying polyol esters. These half-esters often have acid values of at least about 220, say up to about 330, preferably about 300 to 320. As noted above, the reaction products of the hindered diols and aliphatic anhydrides such as succinic anhydride are also useful intermediates, but larger amounts of these products may be required since they have a lower acid content.

The anhydride/hindered diol half-esters can be prepared by reacting the anhydride with an approximately stoichiometric amount based on half-ester formation, of hydroxyl-material in which the hindered diol supplies most, if not all, of the reacted hydroxyl groups, under such conditions as to open the anhydride ring and form the half-ester at one of the anhydride carboxyl groups. Formation of the half-ester reaction products should be conducted at temperatures low enough to avoid esterification at the second, third, or other carboxyl group of the anhydride or at the less reactive hydroxyl group of the hindered diol. Generally, half-ester formation can be conducted at temperatures between about 100° C. and 160° C., more preferably from about 110° C. to 120° C. Suitable molar ratios of hindered diol to anhydride are from about 1:1 to 2:1, preferably from about 1.1:1 to 1.3:1. Half ester formation in this manner is preferably conducted under an inert atmosphere.

Besides the anhydride/hindered diol reaction product and the oil-modifying fatty acid ester polyol components, the components used to form the urethane polymers of the present invention can advantageously include minor weight amounts of unesterified low molecular weight polyols other than the dihydroxy alkanoic acid component. Such low molecular weight polyols may serve to enhance the hardness of the films or coatings which can be formed from the urethane polymer dispersions of the present invention. The low molecular weight polyols are advantageously the same types used to prepare the fatty acid ester polyols as described herein. Generally, such unesterified low molecular polyols may comprise up to about 15% of the total isocyanate-reactive functionality.

Since the anhydrides and their hindered diol half-esters, and possibly other components, are solids at ambient temperatures, the urethane polymer-forming, half-ester, hydroxyl-bearing component of the present invention is generally utilized in a suitable inert solvent. Such solvents are organic and can be comprised essentially of carbon and hydrogen, with or without other elements such as oxygen or nitrogen. Preferably, the solvent contains oxygen, for instance, in the form of a ketone. While it may not be necessary or even advantageous to employ a solvent during preparation of the half-ester the use of a solvent during formation of the urethane polymer is desirable to maintain the reactants in the liquid state, as well as to permit better temperature control during the reaction by serving as a heat sink and, if desired, as a refluxing medium. The solvent employed should not contain active hydrogen as determined by the Zerewitinoff test. Solvents that may be employed include dimethylformamide, esters, ethers, ketoesters, ketones, e.g., methyl ethyl ketone and acetone, ketoethers such as methoxy acetone, glycol-etheresters, e.g., butoxyethanol acetate, chlorinated hydrocarbons, aliphatic and alicyclic hydrocarbon pyrrolidones, e.g., N-methyl pyrrolidones, hydrogenated furans, aromatic hydrocarbons, and the like, and mixtures thereof. The amount of solvent employed, if any, can vary widely in making the prepolymer. The amount of solvent employed should be sufficient to provide a polymer solution having a sufficiently low viscosity to enhance the formation of the urethane polymers. Advantageously, solvent comprises from about 10% to 40% by weight of the polymer solution, preferably from about 15 to 25% by weight.

The oil-modified, water-dispersible urethane polymers of the present invention can be prepared by reacting the half-ester containing component as herein described with hydrocarbon diisocyanates, including the isocyanate-terminated prepolymers thereof. Such isocyanates can be aliphatic, alicyclic or aromatic. The isocyanates can contain non-interfering groups, e.g., aliphatic hydrocarbon radicals such as lower alkyl or other groups, having substantially non-reactive hydrogens as determined by the Zerewitinoff test, *J. Am. Chem. Soc.*, 49, 3181 (1927). The isocyanates often have at least 6 carbon atoms and usually does not have more than about 40 carbon atoms. Isocyanates of about 8 to 20 carbon atoms in the hydrocarbon group are preferred. Suitable isocyanates include 2,4-toluene diisocyanate; 2,6-toluene diisocyanate; 1,4-cyclohexane diisocyanate; dicyclohexylmethane 4,4'-diisocyanate; diphenyl-methane 4,4'-diisocyanate; diphenylmethane 3,4'-diisocyanate; xylene diisocyanate; 1-isocyanato-3-isocyanatomethyl-3,5,5-trimethylcyclohexane; hexamethylene diisocyanate; methylcyclohexyl diisocyanate; 2,4,4,-trimethylhexylmethylene diisocyanate, and the like. The aliphatic and alicyclic isocyanates employed in this invention generally exhibit good resistance to the degradative effects of ultraviolet light. A preferred alicyclic diisocyanate is 4,4'-methylene bis(cyclohexyl isocyanate). Preferred aromatic diisocyanates include toluene diisocyanates (2,4-toluene diisocyanate and 2,6-toluene diisocyanate). The polyisocyanate component used to form the polymers herein can contain a portion of polyisocyanate having more than two isocyanate groups per molecule providing the urethane polymer compositions are not unduly deleteriously affected.

The polyurethane materials of the present invention can be prepared by reacting the hydroxyl-bearing component including the anhydride/hindered diol half-ester with one or more of the foregoing diisocyanates, or their prepolymers, under conditions that promote urethane polymer formation. Reaction generally takes place in an appropriate solvent at temperatures low enough to avoid substantial reaction of the carboxyl groups with the isocyanate (NCO) groups of the isocyanate component. Polymer formation can be carried out by simultaneously reacting the isocyanate with the hydroxyl materials. Alternatively, the isocyanate can be reacted with part or all of one or more of the hydroxyl materials prior to the reaction with remaining portion of these materials. Stepwise mixing of the isocyanate component with the hydroxyl reactants can be used to enhance temperature control and/or produce a blocked copolymer rather than a random copolymer. The reaction temperatures for making the various urethane polymers are often up to about 100° C. with up to about 80° C. being preferred. When an isocyanate-terminated prepolymer is made the reaction is preferably continued until there is little, if any, unreacted hydroxyl functionality remaining, and the prepolymer contains isocyanate groups. The free isocyanate (NCO) content of the prepolymer may be about 2 to 20 percent of the polymer solids, preferably about 5 to 15 percent. The acid value of these prepolymers is often at least about 80, say up to about 160, preferably about 90 to 140, based on prepolymer solids. The reaction can be conducted in the presence of a catalyst such as organo-tin compounds, tertiary amines, and the like; however, this is generally not necessary, and it is often preferred to conduct the reaction without a catalyst. As noted above, variations in the nature and amounts of half-ester and polyol mixtures used in the preparation of the compositions of this invention can be made to provide polymers exhibiting desired characteristics.

Urethane polymer formation can be carried out by admixing the polymer forming and modifying reactants in any suitable sequence desired. In one preferred embodiment of the present invention, a urethane prepolymer containing free carboxylic acid groups is formed by adding to a diisocyanate-containing solution a mixture containing the anhydride/hindered diol half ester and a minor amount of an unsaturated fatty acid ester polyol of the type to be incorporated into the oil-modified, water-dispersible polymer eventually desired. Prepolymer formation in this manner can be carried out by adding the half-ester-polyol mixture to the diisocyanate solution until the free isocyanate (NCO) content of the urethane prepolymer is suitably lowered.

In another embodiment of the present invention, a carboxylic group-containing urethane is formed by reacting a portion of the isocyanate functionality with dihydroxy-containing alkanoic acid, especially the 2,2-dialkylol alkanoic acids. The carboxylic group-containing polyol can be reacted with the isocyanate without significant reaction between the carboxylic groups and the diisocyanate component. Among the polyols which may be employed are those which have relatively unreactive free carboxylic acid groups, for instance, the dihydroxy alkanoic acids having one or two substituents on the alpha carbon atom. The substituent may be, e.g., a hydroxyl or alkyl group, for example, an alkylol group. The polyol has at least one carboxylic group, and generally has 1 to about 3 carboxylic groups, per molecule. The polyol alkanoic acids which may conveniently be employed in accordance with this invention frequently have 2 to about 20 or more, preferably 2 to about 10, carbon atoms such as tartaric acid, the 2,2-dialkylol alkanoic acids, e.g., having alkylol groups of 1 to about 3 carbon atoms, and the like. Preferred substituted alkanoic acids have the general structural formula

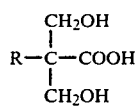

wherein R is hydrogen or alkyl, e.g., lower alkyl, say, of 1 to about 8 carbon atoms. Alkanoic acids of this type including 2,2-dimethylol acetic acid, 2,2-dimethylol propionic acid, 2,2-dimethylol butyric acid, 2,2-dimethylol pentanoic acid and the like, react with the isocyanate to form a urethane prepolymer containing free carboxylic acid groups. A prepolymer formed in this manner can then be further reacted with a component containing, for instance, the anhydride/hindered diol half-ester as hereinbefore described. After addition of the anhydride half-ester component the urethane prepolymer is oil modified by the further addition of fatty acid ester polyol.

Reaction of the alpha,alpha-dimethylol alkanoic acid with isocyanate in this procedure can be carried out to form a urethane prepolymer having an isocyanate (NCO) content of from about 10 to 30% by weight of the prepolymer solids. The reaction of the anhydride half-ester component then serves to reduce the prepolymer free isocyanate content to the desired level, e.g., that suitable for the principal oil modification reaction. Reaction of diisocyanate with substituted alkanoic acid to form a carboxyl-containing prepolymer before the anhydride/hindered diol half-ester is introduced provides polymers having several advantages. Aqueous dispersions of such polymers have desirably high non-volatile contents at acceptable dispersion viscosities. The dispersions further demonstrate advantageous viscosity stability upon aging.

As stated above, the urethane-forming component of the present invention also includes an unsaturated fatty acid ester polyol material that introduces unsaturated fatty acid moieties into the polymer structure to produce "oil-modified" urethane polymers. In a preferred embodiment the major amount of the oil-modifying polyols is reacted with an isocyanate group-containing prepolymer having the anhydride half-ester component reacted therein. The carboxyl group-containing product of this oil-modification reaction generally has an isocyanate group content of less than about 2 weight percent, preferably less than about 0.5 weight percent, on a non-volatile basis. This product can be dispersed in water as an ammonium salt as herein described to provide the collodial aqueous dispersions of the present invention.

The unsaturated fatty acid ester polyols employed in making the products of this invention are advantageously derived from a source of unsaturated fatty acids, or the corresponding lactones, and polyols having, for instance, a molecular weight of up to about 400, say about 60 to 400, and containing aliphatic, alicyclic, or aromatic groups. Among the advantageous low molecular weight polyols or polyether polyols useful for preparation of the fatty acid ester polyols are those having up to about 20 carbon atoms per molecule, for instance, ethylene glycol, 1,2-pentanediol, 1,3-propanediol, 1,4-butanediol, 1,3-butylene glycol, trimethylol propane, 1,4-cyclohexane dimethanol, 1,6-hexanediol, neopentyl glycol, glycerine, pentaerythritol, bisphenol A (2,2-bis(4-hydroxycyclohexyl)propane), polyether reaction products of glycerine or pentaerythritol with ethylene oxide or glycols, and the like, and mixtures thereof. Pentaerythritol and glycerine are preferred polyols.

Fatty acid sources which can be employed in preparation of such fatty ester polyols include olefinically-unsaturated fatty acids and their glycerides, containing up to about 22 carbon atoms in the fatty acid moieties, say about 12 to 18 carbon atoms. Preferred reactants are unsaturated fatty acids and glycerides which contain from one to three or more olefinic double bonds per unsaturated fatty acid moiety, and may be referred to as drying or semi-drying oils, at least when in ester form. Preferably, the unsaturated fatty acid moiety has at least about 2 olefinically-unsaturated bonds per average molecule. The esters are frequently esters of the fatty acid moiety and a low molecular weight polyol having about three or more hydroxyl groups per molecule. In their naturally-occurring forms the esters are generally glycerides. Esters of polyols having about three to four hydroxyl groups per molecule are preferred reactants for the present invention. The unsaturated fatty acid materials include, for example, linoleic acid, palmitoleic acid, linolenic acid, eleostearic acid, licanic acid, arachidonic acid, ricinoleic acid and the like. Also, useful are the mixtures of unsaturated fatty acids derived from natural sources such as dehydrated castor oil, cottonseed oil, linseed oil, olive oil, safflower oil, sardine oil, tung oil, tall oil, soybean oil, sunflower and the like.

Especially suitable fatty acid ester polyols are the transesterification products of pentaerythritol and drying oils. Such products can be prepared in known fashion by, for instance, heating the oil to a temperature of from about 230° to 260° C. under an inert gas followed by addition under agitation of the pentaerythritol. Weight ratios of oil to polyol generally range from about 5:1 to 15:1, preferably from about 7:1 to 10:1. In such transesterification procedures esterification catalysts such as calcium naphthenate can .optionally be utilized to promote the transesterification reaction.

The unneutralized urethane polymers prepared in accordance with the foregoing procedures often have acid values of at least about 40, preferably about 55 to 75, on a solids basis and an isocyanate group content of below about 3 weight %, preferably less than about 0.5 percent, on a solids basis. Generally, when the solvent present during formation of the neutralized dispersion is less hydrophillic, the higher the acid number of the polymer may be to obtain the most desirable dispersions. Such urethane materials, prior to neutralization and water dispersion, are preferably provided in the form of anhydrous solvent solutions having viscosities suitable for dispersing in the aqueous medium. These solutions may have a non-volatile content of from about 50% to 90% by weight, preferably from about 60% to 80% by weight. The solutions may have viscosities of, for example, about 20 to 300 Stokes, preferably about 50 to 150 Stokes.

The oil-modified urethane polymers, dissolved in essentially non-aqueous solvents as described above, contain carboxylic groups that can be neutralized to form polymer salts that can be dispersed in water to provide film-forming compositions. The solvent in which the polymer is dissolved when the solution is dispersed in water should have a sufficient balance of hydrophobic and hydrophillic properties to facilitate dispersal of the polymer in the aqueous phase. This will usually mean that when the dispersion is made the solvent should contain at least a portion of the type known as couplers in order to obtain the more desirable dispersions. These coupling solvents generally contain one or both of oxygen and nitrogen, along with carbon and hydrogen. Such solvents are listed above in the description of the polymer-forming reaction system. Also, since the urethane polymer at this stage has little, if any, isocyanate group content, solvents that are reactive with isocyanate groups, especially alcohols, can be employed. The alkoxy alkanols described herein are particularly preferred coupling solvents. These polymer solutions have sufficient coupling solvent to produce the desired relatively clear, stable, aqueous dispersions, and the weight percent of coupling solvent in the solution dispersed in the aqueous medium may be about 10 to 50 weight %, preferably about 20 to 40%.

Although some coupling solvents may have sufficiently inert properties to be able to serve as a solvent for the reactants and products in the polymer-forming operation, it may be advantageous to use a solvent during polymer formation that is different from the solvent to be employed in making the dispersion. For example, hydrocarbon or ketone solvents may be suitable for use in forming the polymer, but undesirable, at least without the presence of a coupling solvent, in making the aqueous dispersion. The solvent change may be made by merely adding coupling solvent, or making such addition and removing part or substantially all of the solvent already in the composition, or in any other manner. In some situations the aqueous dispersion initially obtained may be more opaque or translucent than desired, and a clearer dispersion may be produced by adding more coupling solvent to the dispersion.

When the solvent of the prepolymer solution is to be replaced at least in part, it is advantageous that this solvent have a relatively low boiling point to facilitate its later replacement. For example, some relatively volatile solvents such as ketones, e.g., acetone, methoxy acetone, butoxyethanol acetate and methyl ethyl ketone, that exhibit good solubility for the reactants and products in the polymer system, have low viscosities that facilitate mixing. The ketones and ether esters are, therefore, preferred solvents. These solvents, however, do not seem to have sufficient hydrophillic or coupling properties to make their presence particularly desirable in forming the aqueous polymer salt dispersion, at least not without the presence of a coupling solvent having greater hydrophillic properties, e.g. the alkoxyalkanols. If the solvent employed during polymer formation or modification is to be present during dispersion of the oil-modified polymer in an aqueous medium, the solvent should have sufficient hydrophillic properties to also be dispersible in the aqueous medium. Thus, the dispersion should be stable, for example, the addition of substantial amounts of water should not cause polymer gelation and phase separation. The lower boiling solvent may be replaced with a higher boiling solvent with greater coupling properties, e.g. an alkanol or alkoxyalkanol before making the aqueous dispersion. After or prior to addition of the higher boiling coupler solvent, at least part, preferably a major part, of the lower boiling solvent may, if desired, be distilled from the mixture.

The aqueous dispersions of the invention are essentially colloidal solutions of polymers in solvents containing a coupler among which are butoxyethanol (Butyl Cellosolve), n-butanol and propoxy-n-propanol. Preferred coupling solvents are alkanols, especially the alkoxyalkanols, of about 4 to 12 carbon atoms. The couplers may, if desired, be comprised of other organic coupling solvents such as those listed above containing one or both of oxygen and nitrogen, along with carbon and hydrogen. When a less hydrophillic solvent, e.g. a ketone, is present along with the coupling solvent, the less hydrophillic solvent may generally comprise a substantial weight amount of the total organic solvent component, e.g. less than about 60%, preferably less than about 50%. When the compositions are not treated to remove part of the less hydrophillic solvent the weight ratio of these solvents may be, for example, about 3:1 to 0.5:1, preferably about 2:1 to 1:1, of the less hydrophillic solvent to coupling solvent.

For best water-dispersibility characteristics, it is preferred that compositions containing hydrophillic coupling solvent and little, if any, of a more hydrophobic solvent, have an acid value of about 40 to 50 (solids basis), while if both types of solvents be present somewhat higher acid values in the range of about 50 to 70 (solids basis) may be needed for good water-dispersibility. In the latter compositions some compromise between film performance and water stability may be necessary. In such cases it is desirable to have low inert solvent and half-ester contents, and high molecular weight and acid value. The factors should be controlled to obtain the best results in a given situation. Compositions containing carboxylic groups from both the half-ester and dihydroxy alkanoic acids, e.g. DMPA, seem to offer the best overall stability and film performance. Preferred acid values have about 50 on a (solids basis), e.g. about 55 to 60 or 65, can readily be obtained in non-stripped compositions, containing both types of the above solvents.

The unneutralized, oil-modified urethane polymers, dissolved in non-aqueous solvents as described above, contain carboxylic groups that can be neutralized to form polymer solids which can be dispersed in water to provide film-forming compositions. In the carboxylic group-containing urethanes of the present invention at least a portion of these groups can be reacted with ammonium hydroxide or with amines having at least one salt-forming amine group, preferably tertiary amine group. Although primary or secondary amines may be used, tertiary amines are less likely to be involved in unwanted reactions. The aliphatic amines include trialkyl amines having 3 to about 12 carbon atoms, such as trimethyl amine, triethyl amine, methyl diethyl amine, N,N-dimethylethanol amine, tripropyl amine, and the like. Thus the alkyl groups of the amine can be substituted with, for instance, hydroxyalkyl or ether groups, as in the alkanolamines such as the dialkylmonoalkanol, alkyldialkanol, trialkanol amines or a morpholine, e.g. N-methyl morpholine. Triethyl amine and N,N-dimethyl ethanol amine are preferred amines. Desirably, the tertiary amine employed is relatively volatile.

The ammonium hydroxide or amines react to form quaternary ammonium salts of the carboxylic groups of the polymer which salts are generally more hydrophillic than the free acid groups. The quaternary ammonium salts of the carboxylic groups of the urethane polymers herein are preferably capable of decomposing during the curing of, e.g., coatings, of the urethanes of this invention, with ammonia or the amine being volatilized and removed from the composition. Thus, the resulting urethanes may be less sensitive to water than the corresponding quaternary ammonium salt group-containing materials.

The quaternary ammonium salts of the carboxylic acids can be provided in amounts such that the aqueous, neutralized urethane polymer dispersion is stable over relatively long periods of time as an essentially colloidal dispersion. In their most advantageous form the dispersions are infinitely dilutable with water or at least are substantially so. Some of the dispersions may, however, be hazy. The ammonium hydroxide or salt-forming amine is, therefore, generally provided in a mole ratio to the carboxylic groups of the polymer of about 0.3:1 to 1.5:1, preferably about 0.7:1 to 1.2:1. The neutralized salt of the polymer can have salt groups other than the ammonium or amine salt groups present, e.g., a minor amount of alkali metal salt, such as the lithium, sodium, and/or potassium salts, on a molar salt basis. urethane films containing unduly large amounts of alkali metal salts are generally less water resistant than films prepared from urethane dispersions of more highly ammonia- or amine-neutralized polymers. Therefore, if the urethane polymer salts contain alkali metal salt groups such alkali metal salt groups should not be in amounts sufficient to unduly detract from the properties of the ultimate film.

The ammonium hydroxide or amine may be added to the polymer in the form of an aqueous solution to provide the dispersion of the neutralized polymer in water. Preferably, a minor amount of water can conveniently be added in admixture with ammonium hydroxide or the amine, and the major amount of water then added. Frequently, the dispersion contains a major amount of water, for example, in a weight ratio to urethane polymer salt solids of about 1.5:1 to 50:1, preferably about 2:1 to 10:1, on a total weight basis.

The reaction between the ammonium hydroxide or amine and the carboxylic groups of the oil-modified urethane polymer can occur at ambient temperature; however, lower or elevated temperatures of, e.g., about 15° C. to 50° C. can also be employed. The polymer mixture can advantageously be agitated, and the addition of the ammonium hydroxide or amine and water conducted over a period of time, e.g., intermediately or continuously for about 0.5 to 30 minutes. If the water, or a portion of the water, of the dispersion is added after the neutralizing agent or neutralizing agent/water mixture, the polymer mixture is advantageously agitated during such water addition to assist in providing the dispersion of the polymer in the aqueous mixture.

The oil-modified urethane polymer which is formed in accordance with the present invention may be in the lower colloidal particle size range, e.g., having an average particle size up to about 0.2 micron, and the average size of the oil-modified urethane-containing polymer particles preferably have an average size of up to about 0.1 micron, e.g., about 0.001 to 0.1 micron. Colloidal dispersions of the oil-modified, urethane polymer in water may appear essentially or nearly transparent and thus may be essentially in solution-like form. The colloidal particle sizes of the urethane polymers of this invention enhance stability of the polymer dispersions in aqueous compositions that may be infinitely-dilutable in aqueous media, especially in the presence of sufficient coupling solvent. With smaller polymer particles, the tendency to form high gloss films may be increased and the ability of the dispersion to accept pigments is generally enhanced. Colloidal size particles are not readily filtered from the dispersions.

The oil-modified urethane polymers of this invention are advantageously employed as aqueous coating compositions. Frequently, the aqueous compositions have a relatively neutral pH, say, about 5 to 10, preferably about 6.5 or 9. The compositions can contain ingredients other than water and the urethane polymer, such as a higher boiling, e.g., slower evaporating than water, solvent for the oil-modified urethane polymer, particularly solvents which may be miscible with water such as dimethyl formamide, N-methyl pyrrolidone, alkoxyalkanols, alkyl diethers, and carboxylic esters derived from alkoxy alkanols. The higher boiling solvent is advantageously provided in an amount sufficient to aid the coalescence of the polymer particles after the bulk to the water has been evaporated. Essentially complete coalescence of the polymer particles tends to provide desirably glossy finishes and enhance physical properties, e.g., strength of the film. Frequently, the slower evaporating solvent is provided in a weight ratio to urethane solids of up to about 0.5:1, preferably about 0.4 to 0.2:1. As noted hereinbefore, the slower evaporating solvent can be introduced during, or after the formation of the urethane prepolymer or the oil-modified polyurethane. It can also be added to the aqueous dispersion of the urethane polymer.

When coating various substrates it is often the case that the coating is applied in multiple layers with the previously applied coating being at least partially dried before the next is added. It is important that the undercoating be in a suitably receptive condition when the next coat is applied. Frequently, for convenience of manufacture it is desirable to apply the next coat on a partially dried coating within an approximate 24 or 48 hour time period. When working with the compositions of this invention we found that during the drying period the coating passes through an intermediate drying stage during which the application of the next coat may lead to an unduly wrinkled film. Once this period is past the coating may be sufficiently dry that the overlying layer can be added without causing wrinkling, but it is often disadvantageous from, for instance, an economical standpoint to delay the subsequent application for such periods of time which may require the undercoating to develop a Sward hardness in the range of say about 25 to 35 or more, depending on the composition involved. It is, therefore, highly advantageous if the length of the drying period during which the underlying coating is not sufficiently dry to have reached the intermediate, wrinkling stage, can be extended. This gives the manufacture greater flexibility in the time of applying the overlying coating and still obtain an essentially non-wrinkled film, without having to delay unduly the latter application.

The nature of this coating and drying process may be explained by noting that the inability to recoat satisfactorily during the intermediate drying period in which the undercoating manifests a hardness that causes wrinkling difficulties, may be due to the overcoating dissolving, but only partially, the previously applied coating. If the overcoating be added to the partially dried coating prior to this period, the latter is apparently essentially completely dissolved by the newly applied material to form a film that does not wrinkle. If one cares to wait until the undercoating is dried past the wrinkling stage, the coating is sufficiently dry so that the overcoat apparently forms a film on top of the undercoat with little, if any, dissolving of the latter and again wrinkling is avoided. As stated, it is generally undesirable to wait for the latter period. It is, therefore, advantageous to find ways in which to control the drying period to avoid reaching the wrinkling stage within a conveniently and extended initial, partial drying period. In this stage the undercoat may have a Sward hardness of say up to about 20 when a next coat is applied, and the hardness should be at least about 5. The preferred hardness range is about 10 to 20 for many compositions. The desirable hardness range may vary depending on factors such as the thickness of the coating, or the composition employed. The suitable hardness range may be affected by, for instance, the amount of diisocyanate used in making the composition.

In many application procedures it is both convenient and economical to apply a topcoat within about 6 to 48 hours from the time the undercoat is deposited on a substrate. It, therefore, is advantageous if one is able to control the development of hardness in the undercoat so that it is in the desired range during most, if not all, of this time period. At least in some cases films made from the aqueous dispersions of the present invention develop hardness at a fast or uncontrolled rate, and it would be particularly advantageous to be able to insure that films have appropriate hardness in the normal recoating time and that such hardness be reliably developed so that topcoating can proceed in a routine manner without having to pretest the undercoated surface for hardness development.

It has been found that the development of hardness in films made from the aqueous dispersions of the present invention can be controlled to be in the desirable range before the wrinkling stage and during at least the major portion of the time frame of about 6 to 48 hours after application to a substrate. This result is achieved by incorporating in the composition a minor, sufficient amount of a tris-hydrocarbyl phosphite. Preferred phosphites can be represented by the formula:

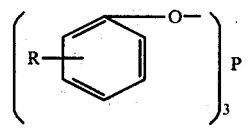

wherein R is hydrogen or an alkyl group. The phosphites generally have at least about 12 carbon atoms per molecule, and each organic group may, for example, contain at least about 4 carbon atoms. Each of the organic groups unsually does not have more than about 20 carbon atoms. In the preferred phosphites of the above formula the R group on each phenyl group may have about 6 to 12 carbon atoms. Exemplary tris-alkylphenyl phosphites are tris-octylphenyl phosphite, tris-nonylphenyl phosphite, tris-laurylphenyl phosphite and the like.

Organic phosphites have heretofore been added to various coating compositions to, for instance, inhibit discoloration but generally the amount employed has been less than that needed in the compositions of the present invention to obtain a substantial delay in the curing of films of the compositions. Thus, even though the phosphite employed in the present invention can be a minor amount of the composition, the amount must still be sufficient to obtain a substantial delay in the hardening of the films. Such amounts may be, for example, at least about 0.3, or at least about 0.5, to 3% by weight of the oil-modified, carboxylic-containing polymer, preferably about 0.5 to 1.5, on a solids, i.e. non-solvent, non-aqueous, basis. The phosphite can be added to the compositions at any appropriate time, and it is preferred to do so when there is present sufficient solvent to insure that the phosphite is dispersed throughout the composition. Most advantageously, the phosphite is part of the carboxylic group-containing polymer solution, or even the isocyanate-terminated prepolymer solution, by, for instance, including the phosphite in the reaction mixture before the diisocyanate is fully reacted. The phosphite can be conveniently added as a solution in a solvent, for instance, the coupling solvent such as butoxyethyl acetate. It may be difficult to properly incorporate the phosphite after the carboxylic group-containing polymer is dispersed in an aqueous phase.

The composition can contain other ingredients for compositions to modify the properties of the resultant oil-modified urethane such as driers, plasticizers, pigments, colorants, dyes, surfactants, thickeners, heat stabilizers, levelling agents, anti-cratering agents, fillers, sedimentation inhibitors, ultraviolet-light absorbers, and the like. The additives such as heat stabilizers, ultraviolet-light absorbers, etc., can be intimately dispersed in the reaction mixture and apparently thereby become an integral part of the individual urethane particles when formed. Alternatively, the additive may be introduced after the urethane polymer has been formed, in which case the additive can be incorporated on the surface of the polymer or dispersed in the aqueous medium.

The oil-modified urethane polymers of this invention including the higher molecular weight urethane polymers can comprise a large amount of the aqueous compositions herein without the composition having an undesirably high viscosity, and the viscosity of the aqueous dispersion can be lower than that of analogous urethane polymers dissolved in organic solvents. The non-volatile content of the coating compositions of this invention can often range from about 1 to 50, preferably about 10 to 35, weight percent of the compositions. The non-volatile content of the compositions can vary depending upon the nature of the coating and the manner in which the coating is to be applied, e.g., by spraying, brushing, transfer coating, etc. As previously noted the aqueous compositions are dilutable with water. Advantageously, water can be employed to thin the compositions, and the washing of application equipment and spattering is facilitated.

The oil-modified urethane polymers of this invention can also be used in applications other than coatings, e.g., in casting to form thin films, as adhesives, and the like. The film-type products generally have a thickness of up to about 30 mils or more, and often such products have a thickness of up to about 10 mils. The oil-modified urethanes can be formed into various materials or articles of greater cross-sectional dimensions, and can be employed in the various ways known in the art for utilization of these types of materials. The coatings, due to the use of water in the compositions, can be dried at temperatures of, say, about 10° C. or more. Advantageously, relatively low temperatures can be employed, however, elevated temperatures can also be used, e.g., temperatures of up to about 150° C., or more to accelerate removal of water and organic solvent.

The invention will be illustrated further by the following examples. All parts and percentages are by weight unless otherwise indicated.

EXAMPLE I

A polyol fatty acid ester composition useful in forming "oil-modified" urethane polymers of the present invention is prepared from linseed oil and pentaerythritol. Under inert gas and with agitation, 1864 parts by weight of alkali-refined linseed oil are heated to 540°–550° F. and held for a bleach color of 2–3 Gardner. The reaction time is 1 to 2 hours. The linseed oil is cooled to 480°–500° F. and 257 parts by weight of pentaerythritol (Tech.) are added rapidly. 1.5 parts by weight of calcium naphthenate (4% Ca) transesterification catalyst is added to the mixture which is heated to 480°–500° F. and maintained at that temperature until the polyol ester is clear as determined by centrifuging a cooled sample and obtaining no separated solids. This reaction time is 2 to 4 hours, after which the reaction mixture is held at this temperature for 2 hours. The product is cooled to 150° F., and 14 parts by weight of tris-nonylphenyl phosphite are added. The resulting product has a hydroxyl value of about 190, a viscosity of about 2.5 Stokes, a Gardner color of 3 and an acid value of 0.5. Fatty acid esterpolyols of this type can be used as an oil-modifier in the products of the present invention. This oil-modifier is hereinafter referred to as Polyol Ester 1.

Aside from Polyol Ester 1, two others are referred to in the following examples. These additional polyesters are also made using calcium naphthenate as a catalyst, and each contains a small amount of tris-nonylphenyl phosphate of about 0.65 weight percent based on solids charged to the reaction flask. Polyol Ester 2 is made from safflower typ fatty acids and pentaerythritol, and has a hydroxyl number of 125, and acid value of 1 to 3, a viscosity of 3 Stokes and a Gardner color of 4 to 5. Polyol Ester 3 is made from safflower oil (non-break) and monopentaerythritol, and has a hydroxyl number of 180, a viscosity of 2.5 Stokes and a Gardner color of 3.

EXAMPLE II

A carboxylic group-containing, half-ester product, useful in preparing the urethane polymers of the present invention, is prepared from trimellitic anhydride (TMA) and 2,2,4-trimethyl-1,3-pentanediol (TMPD). Under an inert atmosphere, 248 parts by weight of TMPD are heated in a reaction vessel to 180° F. to melt the material. After the TMPD is molten, 288 parts by weight of TMA flakes are added and the mixture is heated to 260° to 270° F. with agitation. The TMA flakes melt in the TMPD and the half-ester TMA/TMPD reaction product is formed. The product is a white, opaque, viscous material having an acid value of about 310. This product is cooled to 170° F. and 134 parts by weight of methyl ethyl ketone are added. At 150° F., 223 parts by weight of acetone are added.

EXAMPLE III

The molten TMA/TMPD half-ester reaction mixture of Example II is melted and 27 parts by weight of trimethylol propane (TMP) is added, followed by the slow addition under agitation of 574 parts by weight of Polyol Ester 1. After a fifteen minute period of polyol ester addition, 277 parts by weight of acetone are added to reduce the viscosity of the mixture at 130° F. The fluid TMA/TMPD half-ester-containing mixture has a non-volatile content of about 80 percent and an acid value of 122. It can be used to form oil-modified urethane polymers when reacted with diisocyanates.

EXAMPLE IV

Using the Polyol Ester 1, TMA/TMPD half-ester and TMP-containing solution of Example III an oil-modified, carboxylic group-containing urethane polymer solution is formed. Toluene diisocyanate (696 parts by weight), dibutyl tin dilaurate catalyst (0.63 part by weight) and acetone (523 parts by weight) are added to a reaction vessel under inert gas. The TMPD-TMA-TMP half-ester solution from Example III (1385 parts by weight) is slowly added to the vessel over an hour period. The resulting exotherm raises the temperature of the reaction mixture to about 130° F. where it is maintained with cooling.

After the isocyanate value in the reaction mixture lowers to 6.2%, an additional 1394 parts by weight of Polyol Ester 1 is added at 110° F. over a one-half hour period. After the additional polyol ester had been completely introduced, the temperature of the reaction mixture is raised to 150° F., and the reaction is continued for about eight hours until an isocyanate value of about 0.5% is reached.

To provide a polymer solution more suited to water-dispersion, the acetone solvent is replaced with butoxyethanol. The butoxyethanol (1371 parts by weight) is added to the polymer solution and the acetone is distilled off at 150° F. until a resinous reaction product containing 70% non-volatiles is reached. The resulting urethane polymer solution has an acid value of 37 and a viscosity of 38 Stokes.

EXAMPLE V

An aqueous coating composition containing a dispersion of an ammonia-neutralized polymer of Example IV is prepared by mixing the following ingredients in the amounts and in the order indicated.

|  | Parts by Weight |
|---|---|
| Polymer Solution of Example IV | 1070 |
| Butoxyethanol | 70 |
| Cobalt Drier (5% Co) | 3 |
| Manganese Drier (5% Mn) | 3 |
| *Activ-8 (38% 1, 10-phenyl anthroline) | 3 |
| **L5310 (20% silicone resin in butoxyethanol) | 5 |
| Ammonium Hydroxide (28%) | 35 |
| Water | 1811 |
|  | 3000 |

*Drier accelerator
**Anti-foaming agent

The resulting composition has a pH of about 8.3, a viscosity of about 1.5 to 2 Stokes and a non-volatile content of about 25%. A dispersion of this type is a clear, wood varnish which provides a high-gloss, rapid drying film of good abrasion resistance, color and hardness. The varnish composition itself has a high order of storage stability under ambient or 120° F. temperature conditions.

EXAMPLE VI

Another oil-modified, carboxylic group-containing urethane polymer solution is formed by utilizing a carboxyl-containing polyol in the polymer preparation. Acetone (794 parts by weight), toluene diisocyanate (957 parts by weight), dibutyl tin dilaurate (0.7 part by weight) and alpha, alpha-dimethylol propionic acid (DMPA), (362 parts by weight) are added to a reaction vessel to form a free-moving slurry which is then heated to 135° F. The reaction mixture is held at 135° F. for about 3½ hours until no DMPA crystals remain undissolved.

At this point, 302 parts by weight of a fluid TMA/TMPD half ester-Polyol Ester 1-TMP solution from Example III are added to the reaction mixture which is maintained at 140° F. for about four hours until an isocyanate value of about 6.3% is reached. About 1911 parts by weight of additional Polyol Ester 1 are added over a one-hour period at 110° F. The temperature of the reaction mixture is then raised to about 140° F. and held for about four hours until an isocyanate value of about 0.6% is reached.

As with the Example IV polymer solution, the acetone solvent is replaced with butoxyethanol. This is accomplished by adding about 1483 parts by weight of butoxyethanol and distilling off the acetone from the reaction mixture at 140° F. until a solution containing 70% non-volatiles is obtained. The resulting polymer solution has an acid value of about 53 (solids basis) and a viscosity of about 190 Stokes.

EXAMPLE VII

An aqueous coating composition containing a dispersion of an ammonia-neutralized polymer of Example VI is prepared in the manner of the Example V composition. In the present example, however the polymer solution utilized is that of Example VI and sufficient water and butoxyethanol are left out of the composition such that a final non-volatile content of 30% is realized. Such an aqueous varnish composition provides film-forming and storage stability characteristics similar to those of the Example V varnish.

EXAMPLE VIII

Using Polyol Ester 1 and the TMA/TMPD half ester solution of Example III, an oil-modified, carboxylic group-containing urethane polymer solution is formed. Toluene diisocyanate (696 parts by weight), dibutyl tin dilaurate catalyst (1.0 part by weight) and acetone (300 parts by weight) are added to a reaction vessel. Polyol Ester 1 (1176 parts by weight) is added to the vessel under inert gas and agitation over a period of 1.5 hours while allowing the temperature to exotherm to 100° F. The temperature is then held at 110° F. for 3 hours. The TMPD-TMA half ester solution of Example III (893 parts by weight) is added to the vessel over a ¾ hour period. The resulting reaction mixture is heated to 120° F. where it is maintained until the isocyanate value is 3.2%. TMPD (219 parts by weight) is dissolved in 470 parts by weight of acetone, and the solution is added to the vessel over a one hour period. The temperature of the mixture is held at 120° F. until the isocyanate group content is 0.6%.

To provide a polymer solution more suited to water-dispersion, the acetone solvent is replaced with butoxyethanol. The butoxyethanol (960 parts by weight) is added to the polymer solution and the acetone is distilled off at 160° F. with a strong, inert gas sparge until a resinous reaction product containing 66% non-volatiles is reached. The resulting urethane polymer solution has an acid value of 65 (solids basis), a viscosity of 120 Stokes and a Gardner color of 9.

EXAMPLE IX

An aqueous coating composition containing a dispersion of an ammonia-neutralized polymer of Example VIII is prepared by mixing the following ingredients in the amounts and in the order indicated.

|  | Parts by Weight |
|---|---|
| Polymer Solution of Example VIII | 113.0 |
| Butoxyethanol | 1.0 |
| Cobalt Drier (5% Co) | 1.2 |
| Ammonium Hydroxide (28%) | 5.0 |
| Water | 180.0 |
|  | 300.2 |

The resulting composition is a clear, single phase dispersion having a viscosity of about 0.8 poise and a non-volatile content of about 25%. A 3 mil, wet film of this composition dries to a clear, hard film in 2 hours. After 1 week the film has a pencil hardness of F. The stability of the composition is determined under accelerated ageing conditions at 160° F., and it is 8 days before there is a phase separation between polymer and water.

EXAMPLE X

Using the Polyol Ester 2, the TMA/TMPD half ester and TMP containing solution of Example III, an oil-modified, carboxylic group-containing urethane polymer solution is formed. Toluene diisocyanate (696 parts by weight), dibutyl tin dilaurate catalyst (1.2 parts by weight) and acetone (375 parts by weight) are added to a reaction vessel. Polyol Ester 2 (1760 parts by weight) is added to the vessel under inert gas and agitation over a period of 1.5 hours while allowing the temperature to exotherm to 120° F. which is held for several hours. The mixture is allowed to cool to room temperature and the TMPD-TMA half ester solution of Example III (1073 parts by weight) is added to the vessel over a one-half hour period. The resulting reaction mixture is heated to about 125° F. where it is maintained until the isocyanate value in the reaction mixture is 1.9%. Cyclohexane dimethylol (187 parts by weight) is dissolved in 234 parts by weight of acetone, and the solution is added over a one-half hour period to the reaction vessel which is cooled to room temperature. The reaction mixture is heated to 130° F. and held until the isocyanate group content is 0.4%.

To provide a polymer solution more suited to water-dispersion, the acetone solvent is replaced with butoxyethanol. The butoxyethanol (1350 parts by weight) is added to the polymer solution and the acetone is distilled off at 160° F. with a strong, inert gas sparge until a resinous reaction product containing 68% non-volatiles is reached. The resulting urethane polymer solution has an acid value of 60 (solids basis), a viscosity of 112 Stokes and a Gardner color of 6+.

EXAMPLE XI

An aqueous coating composition containing a dispersion of an ammonia-neutralized polymer of Example X is prepared by mixing the following ingredients in the amounts and in the order indicated.

|  | Parts by Weight |
|---|---|
| Polymer Solution of Example X | 110.0 |
| Butoxyethanol | 4.0 |
| Cobalt Drier (5% Co) | 1.2 |
| Ammonium Hydroxide (28%) | 5.0 |
| Water | 179.0 |
|  | 299.2 |

The resulting composition is a clear, single phase dispersion having a viscosity of about 0.5 poise and a non-volatile content of about 25%. A 3 mil, wet film of this composition dries to a clear, hard film in 1.5 hours. After 1 week, the film has a pencil hardness of H. The stability of the composition is determined under accelerated ageing conditions at 160° F., and it is 9 days before there is a phase separation between polymer and water.

EXAMPLE XII

A carboxylic group-containing, half ester product, useful in preparing the urethane polymers of the present invention, is prepared from trimellitic anhydride (TMA), 2,2,4-trimethyl-1, 3-pentanediol (TMPD) and trimethylol propane (TMP). Under an inert atmosphere, 219 parts by weight of TMPD are heated in a reaction vessel to 180° F. to melt the material. After the TMPD is molten, 27 parts by weight of TMP and 288 parts by weight of TMA flakes are added and the mixture is heated to 270° F. with agitation. The TMA flakes melt in the TMPD and the half-ester TMA/TMP/TMPD reaction product is formed in ½ hour. The product is a white, opaque, viscous material having an acid value of about 310. This product is cooled to 140° F. and 266 parts by weight of acetone are added.

EXAMPLE XIII

Using Polyol Ester 1 and the TMA/TMP/TMPD half-ester solution of Example XII, an oil-modified, carboxylic acid-containing urethane polymer solution is formed. Toluene diisocyanate (696 parts by weight), dibutyl tin dilaurate catalyst (1.0 part by weight) and acetone (520 parts by weight) are added to a reaction vessel. Polyol Ester 1 (529 parts by weight) is blended with 800 parts by weight of the TMA-TMP-TMPD half ester of Example XII, and the blend is added to the vessel under inert gas and agitation over a 1 hour period while allowing the temperature to exotherm at 120° F. The temperature is held at 120° F. until the isocyanate content of the reaction mixture is 7.5%.

The reaction mixture is cooled to room temperature and 1382 parts by weight of Polyol Ester 1 is added over a ¾ hour period. After the additional polyol ester had been completely introduced, the temperature of the reaction mixture is raised to 140° F., and the reaction is continued for about 6 hours until an isocyanate value of about 0.6% is reached.

To provide a polymer solution more suited to water-dispersion, the acetone solvent is replaced with butoxyethanol. The butoxyethanol (1260 parts by weight) is added to the polymer solution, and the acetone is distilled off at 150° F. with a strong, inert gas sparge until a resinous reaction product containing 71% non-volatiles is reached. The resulting urethane polymer solution has an acid value of 52 (solids basis), a viscosity of 71 Stokes, and a Gardner color of 9.

EXAMPLE XIV

An aqueous coating composition containing a dispersion of an ammonia-neutralized polymer of Example XIII is prepared by mixing the following ingredients in the amounts and in the order indicated.

| | Parts by Weight |
|---|---|
| Polymer Solution of Example XIII | 106.0 |
| Butoxyethanol | 4.0 |
| Cobalt Drier (5% Co) | 1.2 |
| Ammonium Hydroxide (28%) | 5.0 |
| Water | 134.0 |
| | 250.2 |

The resulting composition is a clear, single phase dispersion having a viscosity of about 4.2 poise and a non-volatile content of about 30%. A 3 mil, wet film of this composition dries to a clear hard film in 2.5 hours. After 1 week, the film has a pencil hardness of F. The stability of the aqueous composition is determined under accelerated ageing conditions at 160° F. and it is 5 days before there is separation between polymer and water.

EXAMPLE XV

Using Polyol Ester 2 and the TMA-TMP-TMPD half ester solution of Example XII an oil-modified, carboxylic group-containing urethane polymer solution is formed. Toluene diisocyanate (696 parts by weight), dibutyl tin dilaurate catalyst (1.2 parts by weight) and acetone (426 parts by weight) are added to a reaction vessel. The contents of the vessel were placed under an inert gas with agitation. TMP (47 parts by weight) is dissolved in 44 parts by weight of acetone. The mixture is blended with 808 parts by weight of Polyol Ester 2 and 1016 parts by weight of the TMA-TMP-TMPD solution. This mixture is added to the vessel under inert gas and agitation over a period of 0.5 hour while allowing the temperature to exotherm to 145° F. The temperature is then held at 140° F. until the isocyanate value is 4.0%. The reaction mixture is cooled to room temperature and 1437 parts by weight of Polyol Ester 2 are added to the vessel over a one-half hour period. The temperature of the mixture exotherms to 100° F. and the mixture is heated to 140° F. and held at 140° F. until the isocyanate group content is 0.5%.

To provide a polymer solution more suited to water-dispersion the acetone solvent is replaced with butoxyethanol. The butoxyethanol (1620 parts by weight) is added to the polymer solution and the acetone is distilled off at 150° F. with a strong, inert gas sparge until a resinous reaction product containing 71% non-volatiles is reached. The resulting urethane polymer solution has an acid value of 58 (solids basis), a viscosity of 67 Stokes and a Gardner color of 8.

EXAMPLE XVI

An aqueous coating composition containing a dispersion of an ammonia-neutralized polymer of Example XV is prepared by mixing the following ingredients in the amounts and in the order indicated.

| | Parts by Weight |
|---|---|
| Polymer Solution of Example XV | 106.0 |
| Butoxyethanol | 4.0 |
| Cobalt Drier (5% Co) | 0.3 |
| Manganese Drier (5% Mn) | 0.3 |
| Activ-8 | 0.3 |
| Ammonium Hydroxide (28%) | 5.2 |
| Water | 134.0 |
| | 250.1 |

The resulting composition is a clear, single phase dispersion having a viscosity of about 2.7 poises and a nonvolatile content of about 30%. A 3 mil, wet film of this composition dries to a clear, hard film in 2.5 hours. After 1 week the film has a pencil hardness of F. The stability of the composition is determined under accelerated ageing conditions at 160° F., and it is 3 days before there is a phase separation between polymer and water.

EXAMPLE XVII

A carboxylic group-containing, half ester product, useful in preparing the urethane polymers of the present invention, is prepared from trimellitic anhydride (TMA) and 2,2,4-trimethyl-1, 3-pentanediol (TMPD), and Polyol Ester 3 is added to the half ester. Under an inert atmosphere, 248 parts by weight of TMPD are added to a reaction vessel and heated under inert gas to 180° F. to melt the material. Agitation of the melt is started. TMA (288 parts by weight) is added and the mixture is heated at 250° F. for ¾ hour, thereby forming a half-ester TMA/TMPD reaction product. The product is a white, opaque material of 310 acid value. Polyol Ester 3 (317 parts by weight) is immediately added to the half ester. The mixture is cooled to 150° F., and 365 parts by weight of methyl ethyl ketone are added.

EXAMPLE XVIII

Using the TMA/TMPD half ester Polyol Ester 3 solution of Example XVII, an oil-modified, carboxylic group-containing urethane polymer solution is formed. Toluene diisocyanate (957 parts by weight), DMPA (201 parts by weight), tris-nonylphenylphosphite (herein referred to as TNPP) (2.3 parts by weight) dibutyl tin dilaurate catalyst (0.9 part by weight) and methyl ethyl ketone (722 parts by weight) are added to a reaction vessel. The reaction mixture is agitated at 170° F. under inert gas until all the DMPA crystals have dissolved and reacted. The reaction mixture is then cooled to 125° F. The TMPD-TMA half ester Polyol Ester 3 solution of Example XVII (1272 parts by weight) is added to the vessel over a ½ hour period at 125° F. The resulting reaction mixture is heated to 150° F. where it is maintained for 2 hours at which time the isocyanate value is 6.5%. The mixture is cooled to 130° F. and Polyol Ester 3 (2325 parts by weight) is added to the vessel over a 20 minute period. The mixture is held at 160° F. until the isocyanate group content is 0.4%. Butoxyethanol (875 parts by weight) is added to the polymer solution and a resinous reaction product containing 70% non-volatiles is obtained. The resulting urethane polymer solution has an acid value of 57 (solids basis), a viscosity of 14 Stokes and a Gardner color of 5+.

EXAMPLE XIX

An aqueous coating composition containing a dispersion of an ammonia-neutralized polymer of Example XVIII is prepared by mixing the following ingredients in the amounts and in the order indicated.

| | Parts by Weight |
|---|---|
| Polymer Solution of Example XVIII | 107.0 |
| Butoxyethanol | 3.0 |
| Cobalt Drier (5% Co) | 0.3 |
| Manganese Drier (5% Mn) | 0.3 |
| Activ-8 | 0.15 |
| L5310 | 0.5 |
| Ammonium Hydroxide (28%) | 5.8 |
| Water | 133.0 |
| | 250.05 |

The resulting composition is a clear, single phase dispersion having a viscosity of about 2.4 poises and a non-volatile content of about 30%. A 3 mil, wet film of this composition dries to a clear, hard film in 1.5 hours. After 1 week the film has a Sward hardness of 30. The stability of the composition is determined under accelerated ageing conditions at 160° F., and after 8 days there is no phase separation between polymer and water when the test was discontinued.

EXAMPLE XX

Using the TMA/TMPD half ester Polyol Ester 3 solution of Example XVII, an oil-modified, carboxylic group-containing urethane polymer solution is formed. Toluene diisocyanate (957 parts by weight), DMPA (335 parts by weight), TNPP (2.0 parts by weight) dibutyl tin dilaurate catalyst (0.8 part by weight) and methyl ethyl ketone (758 parts by weight) are added to a reaction vessel. The reaction mixture is agitated at 160° F. under inert gas until all the DMPA crystals have dissolved and reacted. The reaction mixture is then cooled to 120° F. The TMPD-TMA half ester Polyol Ester 3 solution of Example XVII (891 parts by weight) is added to the vessel over a ½ hour period. The resulting reaction mixture is heated to 160° F. where it is maintained until the isocyanate value is 5.2%. The mixture is cooled to 130° F. and Polyol Ester 3 (2185 parts by weight) is added to the vessel over a 30 minute period. The mixture is held at 160° F. until the isocyanate group content is 0.3%. Butoxyethanol (820 parts by weight) is added to the polymer solution and a resinous reaction product containing 70% non-volatiles is obtained. The resulting urethane polymer solution has an acid value of 62 (solids basis), a viscosity of 30 Stokes and a Gardner color of 5.

EXAMPLE XXI

An aqueous coating composition containing a dispersion of an ammonia-neutralized polymer of Example VIII is prepared by mixing the following ingredients in the amounts and in the order indicated.

| | Parts by Weight |
|---|---|
| Polymer Solution of Example XIX | 107.0 |
| Butoxyethanol | 3.0 |
| Cobalt Drier (5% Co) | 0.3 |
| Manganese Drier (5% Mn) | 0.3 |
| Activ-8 | 0.15 |
| L5310 | 0.5 |
| Ammonium Hydroxide (28%) | 6.0 |
| Water | 132.75 |
| | 250.0 |

The resulting composition is a clear, single phase dispersion having a viscosity of about 1.5 poises and a non-volatile content of about 30%. A 3 mil, wet film of this composition dries to a clear, hard film in 2.5 hours. After 1 week the film has a Sward hardness of 28. The stability of the composition is determined under accelerated ageing conditions at 160° F., and after 8 days there is no phase separation between polymer and water.

EXAMPLE XXII

A carboxylic group-containing, half-ester product, useful in preparing the urethane polymers of the present invention, is prepared from pyromellitic dianhydride (PMDA) and 2,2,4-trimethyl-1,3-pentanediol (TMPD), and Polyol Ester 3 is added to the reaction product. Under an inert atmosphere, 555 parts by weight of TMPD are added to a reaction vessel and heated under inert gas to 180° F. to melt the material. Agitation of the melt is started. PMDA (324 parts by weight) is added and the mixture is heated to 250° F. until the half-ester PMDA/TMPD reaction product is formed, as a clear, slightly brownish liquid. Polyol Ester 3 (307 parts by weight) and butoxyethanol acetate (508 parts by weight) are immediately added.

EXAMPLE XXIII

Using the PMDA/TMPD half-ester Polyol Ester 3 solution of Example XXII, an oil-modified, carboxylic group-containing urethane polymer solution is formed. Toluene diisocyanate (957 parts by weight), DMPA (134 parts by weight), TNPP (21 parts by weight) dibutyl tin dilaurate catalyst (0.75 part by weight), butoxyethanol acetate (116 parts by weight) and methoxy acetone (618 parts by weight) are added to a reaction vessel. The reaction mixture is agitated at 160° F. under inert gas until all the DMPA crystals have dissolved and reacted. The reaction mixture is then cooled to 130° F. The PMDA-TMA half ester Polyol Ester 3 solution of Example XXII (1482 parts by weight) is added to the vessel over a ½ hour period. The resulting reaction mixture is heated to 160° F. where it is maintained until the isocyanate value is 6.6%. The mixture is cooled to 130° F. and Polyol Ester 3 (1842 parts by weight) is added to the vessel over a 30 minute period. The mixture is held at 160° F. until the isocyanate group content is 0.7%. Butoxyethanol (610 parts by weight) is added to the polymer solution and a resinous reaction product containing 72% non-volatiles is obtained. The resulting urethane polymer solution has an acid value of 48 (solids basis), a viscosity of 630 poises and a Gardner color of 7.

EXAMPLE XXIV

An aqueous coating composition containing a dispersion of an ammonia-neutralized polymer of Example XXIII is prepared by mixing the following ingredients in the amounts and in the order indicated.

|  | Parts by Weight |
|---|---|
| Polymer Solution of Example XXIII | 104.0 |
| Butoxyethanol | 10.0 |
| Cobalt Drier (5% Co) | 1.2 |
| Ammonium Hydroxide (28%) | 4.8 |
| Water | 180.0 |
|  | 300.0 |

The resulting composition is a clear, single phase dispersion having a viscosity of about 27 poises and a nonvolatile content of about 25%. A 3 mil, wet film of this composition dries to a clear, hard film in 2.5 hours. After 1 week the film has a Sward hardness of 26. The stability of the composition is determined under accelerated ageing conditions at 160° F., and after 20 days there is no phase separation between polymer and water.

EXAMPLE XXV

Using the TMA/TMPD half ester Polyol Ester 3 solution of Example XVII, an oil-modified, carboxylic group-containing urethane polymer solution is formed. Toluene diisocyanate (696 parts by weight), DMPA (201 parts by weight), TNPP (17.6 parts by weight) dibutyl tin dilaurate catalyst (0.6 parts by weight) and methyl ethyl ketone (444 parts by weight) are added to a reaction vessel. The mixture is agitated under inert gas and heated to 120° F. The TMPD-TMA half ester Polyol Ester 3 solution of Example XVII (1531 parts by weight) is added to the vessel over a ½ hour period and the mixture is held for 1 hour. The resulting mixture is heated to 150° F. where it is maintained until the isocyanate value is 7.0%. The mixture is cooled to 130° F. and Polyol Ester 3 (1763 parts by weight) is added to the vessel over a 30 minute period. The mixture is held at 150° F. until the isocyanate group content is 0.5%. To build viscosity 87 parts by weight of toluene diisocyanate is added and the mixture is held until the NCO content is 0.4%. Butoxyethanol (460 parts by weight) is added to the polymer solution and a resinous reaction product containing 72% non-volatiles is obtained. The resulting urethane polymer solution has an acid value of 57 (solids basis), a viscosity of 14 Stokes and a Gardner color of 7.

EXAMPLE XXVI

An aqueous coating composition containing a dispersion of an ammonia-neutralized polymer of Example XXV is prepared by mixing the following ingredients in the amounts and in the order indicated.

|  | Parts by weight |
|---|---|
| Polymer Solution of Example XXV | 104.0 |
| Butoxyethanol | 10.0 |
| Cobalt Drier (5% Co) | 1.2 |
| Ammonium Hydroxide (28%) | 5.5 |
| Water | 179.3 |
|  | 300.0 |

After addition of about ¾ of the water, the dispersion turns milky white. An additional 14 parts by weight of butoxyethanol is added to produce a clear dispersion. This increase in solvent may make the dispersion less desirable from an air pollution standpoint.

EXAMPLE XXVII

A carboxylic group-containing, half-ester product, useful in preparing the urethane polymers of the present invention, is prepared from trimellitic anhydride (TMA) and 2,2,4-trimethyl-1,3-pentanediol (TMPD), and Polyol Ester 3 is added to the half ester. Under an inert atmosphere, 248 parts by weight of TMPD are added to a reaction vessel and heated under inert gas to 180° F. to melt the material. Agitation of the melt is started. TMA (288 parts by weight) is added and the mixture is heated at 250° F. for ¾ hour, thereby forming a half-ester TMA-TMPD reaction product. The product is a white, opaque material of 310 acid value. Polyol Ester 3 (317 parts by weight) is immediately added to the half-ester. The mixture is cooled to 150° F., and 365 parts by weight of butoxyethanol acetate are added to the half-ester.

An oil-modified, carboxylic group-containing urethane polymer solution is formed by adding toluene diisocyanate (957 parts by weight), DMPA (335 parts by weight), tris-nonylphenylphosphite (10 parts by weight), dibutyl tin dilaurate catalyst (0.8 parts by weight), methoxyacetone (536 parts by weight), and butoxyethanol acetate (150 parts by weight) are added to a reaction vessel. The reaction mixture is agitated at 160° F. under inert gas until all the DMPA crystals have dissolved and reacted. The reaction mixture is then cooled to 130° F. The TMPD-TMA, half-ester, Polyol Ester 3, butoxyethanol acetate solution (690 parts by weight) is added to the vessel over a ½ hour period at 130° F. The resulting reaction mixture is heated to 160° F. where it is maintained for 15 minutes at which time the isocyanate value is 6.3%. The mixture is cooled to 130° F. and Polyol Ester 3 (2282 parts by weight) is added to the vessel over a 30 minute period. The mixture is held at 160° F. until the isocyanate group content is 0.2%. Butoxyethanol (892 parts by weight) is added to the polymer solution and a resinous reaction product containing 70% nonvolatiles is obtained. The resulting urethane polymer solution has an acid value of 56 (solids basis), a viscosity of 80 Stokes and a Gardner color of 6.

An aqueous coating composition containing a dispersion of the urethane polymer solution is prepared by mixing the following ingredients in the amounts and in the order indicated.

|  | Parts by Weight |
|---|---|
| Polymer Solution of Example XVIII | 107.0 |
| Butoxyethanol | 6.5 |
| Cobalt Drier (5% Co) | 0.3 |
| Manganese Drier (5% Mn) | 0.3 |
| Activ-8 | 0.15 |
| L5310 | 0.5 |
| Ammonium Hydroxide (28%) | 5.8 |
| Water | 167.45 |
|  | 288.00 |

The resulting composition is a clear, single phase dispersion having a viscosity of about 2.4 poises and a non-volatile content of about 26%. A 3 mil, wet film of this composition dries to a clear, hard film in 2.5 hours. After 1 week the film has a Sward hardness of 30. The stability of the composition is determined under accelerated ageing conditions at 160° F., and after 10 days there is no phase separation between polymer and water when the test was discontinued.

The development of hardness in films made from the compositions of the present invention can be controlled by the addition of a minor amount of tris-alkylphenyl phosphite, e.g. tris-nonylphenyl phosphite (TNPP). This effect is shown in the following study in which the hardness of films made from the aqueous dispersion prepared as described immediately above was determined during the first 48 hours. The dispersions had similar compositions except that the amount of TNPP included was varied as indicated in Table I.

In the tests, wet films of 3 mil thickness were deposited on glass, and the films were dried in the atmosphere at 50% relative humidity and 77° F. The hardness of the films was determined at several time intervals. The results are in Table I:

TABLE I

| TNPP Level | Sward Hardness | | | |
|---|---|---|---|---|
| (Wt. % on resin solids) | 17 Hrs. | 24 Hrs. | 41 Hrs. | 48 Hrs. |
| 0.4 | 14 | 18 | 28 | 30 |

TABLE I-continued

| TNPP Level | Sward Hardness | | | |
|---|---|---|---|---|
| (Wt. % on resin solids) | 17 Hrs. | 24 Hrs. | 41 Hrs. | 48 Hrs. |
| 0.65 | 12 | 16 | 26 | 28 |
| 0.8 | 10 | 10 | 20 | 24 |
| 1.1 | 10 | 10 | 16 | 20 |

It is seen from the data in Table I that the addition of a small amount of the tris-alkylphenyl phosphite markedly reduced the rate of hardness development during the first 48 hours, the significant time period. Thus, about 1% of the additive was most effective in reducing the development of hardness to the most desirable level to insure that a subsequently applied film would encounter an advantageous substrate if recoated during the first 24 or 48 hours and wrinkling thereby avoided to a substantial extent if not essentially entirely.

EXAMPLE XXVIII

A carboxylic group-containing, half-ester product, useful in preparing the urethane polymers of the present invention, is made from succinic anhydride (SA) and 2,2,4-trimethyl-1,3-pentanediol (TMPD). Under an inert atmosphere, 248 parts by weight of TMPD are heated in a reaction vessel to 180° F. to melt the material. After the TMPD is molten, 150 parts by weight of SA flakes are added and the mixture is heated to 270° F. with agitation. The SA flakes melt in the TMPD and the half-ester SA/TMPD reaction product is formed. The product is a water white, clear material having an acid value of about 211. This product is cooled to 170° F. and 170 parts by weight of methyl ethyl ketone are added to give a solution that is 70% non-volatile.

EXAMPLE XXIX

Using Polyol Ester 1 and the SA/TMPD half-ester solution of Example XXVIII, an oil-modified, carboxylic group-containing urethane polymer solution is formed. Toluene diisocyanate (870 parts by weight), dubutyl tin dilaurate catalyst (0.6 part by weight) and methyl ethyl ketone (465 parts by weight) are added to a reaction vessel. Polyol Ester 1 (1170 parts by weight) is added to the vessel under inert gas and agitation over a period of 1.5 hours while allowing the temperature to exotherm to 120° F. The temperature is then held at 120° F. for several hours. The SA/TMPD half-ester solution of Example XXVIII (1056 parts by weight) is added to the vessel over a 1.5 hour period at 120° F. The resulting reaction mixture is heated to 130° F. where it is maintained until the isocyanate value is 2.4%. TMPD (219 parts by weight) is dissolved in 100 parts by weight of methyl ethyl ketone, and the solution is added to the vessel over a 45-minute period at 120° F. The temperature of the mixture is held at 160° F. for several hours until the isocyanate group content is 0.3%.

To provide a polymer solution more suited to water-dispersion, the ketone solvent is replaced with butoxyethanol. The butoxyethanol (1400 parts by weight) is added to the polymer solution and the ketone is distilled off at 160° F. with a strong, inert gas sparge until a resinous reaction product containing 68% non-volatiles is reached. The resulting urethane polymer solution has an acid value of 52 (solids basis), a viscosity of 88 Stokes and a Gardner color of 5.

EXAMPLE XXX

An aqueous coating composition containing a dispersion of an ammonia-neutralized polymer of Example XIX is prepared by mixing the following ingredients in the amounts and in the order indicated.

|  | Parts by Weight |
|---|---|
| Polymer Solution of Example VIa | 110.0 |
| Butoxyethanol | 4.0 |
| Cobalt Drier (5% Co) | 1.2 |
| Ammonium Hydroxide (28%) | 5.0 |
| Water | 80.0 |
|  | 300.2 |

The resulting composition is a clear, single phase dispersion having a viscosity of about 6 poises and a non-volatile content of about 25%. A 3 mil, wet film of this composition dries to a clear, hard film in 6 hours. After 1 week the film has a sward hardness of 32. The stability of the composition is determined under accelerated ageing conditions at 160° F., and it is 5 days before there is a phase separation between polymer and water.

EXAMPLE XXXI

This example shows that the reaction of TMA and Polyol Ester 1 to prepare a half ester does not proceed satisfactorily, at least not under the conditions stated. The TMA flakes (96 parts by weight) and Polyol Ester 1 (1480 parts by weight) are charged to a reaction flask. The mixture is agitated under inert gas and heated to 250° F. This temperature is held but the TMA flakes do not dissolve and react. The temperature is raised to 330° F. and after several hours flakes of TMA and an insoluble precipitate stick to the sides of the flask. Also, there is discoloration due to the use of excessive temperatures.

EXAMPLE XXXII

This example shows that a half ester of TMA and a preformed prepolymer of toluene diisocyanate and Polyol Ester 1, extended with 1,3-butylene glycol is a discolored resin that can be dissolved in butoxyethanol. The discoloration is apparently due to the relatively high temperature needed to form the half-ester. An aqueous dispersion of the solution in ammonium salt form is hazy, and a film thereof quickly yellows. The dispersion separates overnight when it is at 160° F.

Toluene diisocyanate (696 parts by weight), dibutyl tin dilaurate catalyst (0.5 part by weight) and methyl ethyl ketone (418 parts by weight) are added to a reaction vessel. Polyol Ester 1 (1176 parts by weight) is added to the vessel under inert gas and agitation over a period of 2 hours while allowing the temperature to exotherm to 110° F. The reaction mixture is held until the exotherm has subsided. 1,3-Butylene glycol (270 parts by weight) is added to the vessel over a 1 hour period, and the temperature is allowed to exotherm at 110° F. The resulting reaction mixture is heated to 200° F. where it is maintained until the isocyanate value is 0. TMA (234 parts by weight) is added to the vessel, and the contents are then heated to 250° F. to form a half ester. Methyl ethyl ketone is removed as it distills from the vessel. The reaction time is 1.5 hours and the resin discolors greatly during this stage. Butoxyethanol (622 parts by weight) is added to the polymer solution. The resulting urethane polymer solution has 75 non-volatiles, an acid value of 58 (solids basis), a viscosity of 314 Stokes and a Gardner color of 11+.

An aqueous coating composition containing a dispersion of an ammonia-neutralized polymer is prepared by mixing the following ingredients in the amounts and in the order indicated. The water is slowly added with agitation, and then the pH is adjusted to 8.0.

|  | Parts by Weight |
|---|---|
| Polymer Solution | 100.0 |
| Butoxyethanol | 15.0 |
| Cobalt Drier (5% Co) | 1.2 |
| Ammonium Hydroxide (28%) | 5.2 |
| Water | 179.0 |
|  | 300.4 |

The resulting composition is hazy and has a nonvolatile content of about 25%. A 3 mil, wet film of this composition dries to a hazy film that greatly yellows after 1 week in air. The stability of the composition is determined under accelerated ageing conditions at 160° F., and there is a phase separation between polymer and water overnight.

EXAMPLE XXXIII

This example shows that an aqueous dispersion of an ammonium salt of a polymer solution made by reacting a prepolymer of toluene diisocyanate and Polyol Ester 1 with a TMA-butylene glycol half ester is quite unstable. A film made from this dispersion is very brittle and quickly yellows in air.

A carboxylic group-containing, half ester product, is prepared from 375 parts by weight of trimellitic anhydride (TMA) and 315 parts by weight of 1,3-butylene glycol (BG). The materials are added to a reaction vessel and heated to 230°-240° F. under an inert gas and with agitation. The TMA flakes melt in the BG and the half ester TMA/BG reaction product is formed. The product is a white, opaque, highly viscous material that solidifies on cooling. The product is cooled to 150° F. and 333 parts by weight of acetone are added. Toluene diisocyanate (696 parts by weight), dibutyl tin dilaurate catalyst (0.5 part by weight) and acetone (258 parts by weight) are added to a reaction vessel. Polyol Ester 1 (1176 parts by weight) is added to the vessel under inert gas and agitation over a period of 1.5 hours while allowing the temperature to exotherm to 110° F. The reaction mixture is held until the exotherm subsides. The BG/TMA half ester solution (993 parts by weight) is added to the vessel over a 1.5 hour period while maintaining a temperature of 110° F. After several hours at this temperature 500 parts by weight of acetone are added to reduce the viscosity of the reaction mixture. An additional 230 parts by weight of BG are added over 20 minutes, and the mixture held until the isocyanate value is 0.8%. To provide a polymer solution more suited to water-dispersion, the acetone solvent is replaced with butoxyethanol. The butoxyethanol (900 parts by weight) is added to the polymer solution and the acetone is distilled off at 160° F. with a strong, inert gas sparge until a resinous reaction product containing 71% non-volatiles is reached. The resulting urethane polymer solution has a high acid value of 87 (solids basis), a viscosity of 400 Stokes and a Gardner color of 10.

An aqueous coating composition containing a dispersion of an ammonia-neutralized polymer of Example VIII is prepared by mixing the following ingredients in the amounts and in the order indicated. The water is slowly added with agitation and then the pH is adjusted to 8.0.

|  | Parts by Weight |
| --- | --- |
| Polymer Solution | 106.0 |
| Butoxyethanol | 8.0 |
| Cobalt Drier (5% Co) | 1.2 |
| Ammonium Hydroxide (28%) | 7.2 |
| Water | 178.0 |
|  | 300.4 |

The resulting composition is a clear, single phase dispersion having a non-volatile content of about 25%. A 3 mil, wet film of this composition dries to a clear, hard, very brittle film in 2.5 hours, and after 1 week in air the film yellows. The stability of the composition is determined under accelerated ageing conditions at 160° F., and after less than 1 day there is phase separation between polymer and water.

EXAMPLE XXXIV

Another polyol fatty acid ester composition useful in forming "oil-modified" urethane polymers of the present invention is prepared from safflower oil and pentaerythritol. Under inert gas and with agitation, 1864 parts by weight of non-break safflower oil are heated to 540°–550° F., and held for a bleach color of 2–3 Gardner. The reaction time is 1 to 2 hours. The safflower oil is cooled to 480°–500° F. 245 parts by weight of pentaerythritol and 1.5 parts by weight of calcium naphthenate (4% Ca) transesterification catalyst are added to the oil and the mixture is heated to 480°–500° F. and maintained at that temperature until the polyol ester is clear as determined by centrifuging a cooled sample and obtaining no separated solids. This reaction time is 2 to 4 hours, after which the reaction mixture is held at this temperature for 2 hours. The product is cooled, has a hydroxyl value of about 175, a viscosity of about 2.5 Stokes, a Gardner color of 3 and an acid value of 1.0. This oil-modifier is hereinafter referred to as Polyol Ester 4.

EXAMPLE XXXV

A carboxylic group-containing, half-ester product, useful in preparing the urethane polymers of the present invention, is prepared from TMA and 2-ethyl-1,3-hexanediol. Under an inert atmosphere, 248 parts by weight of 2-ethyl-1,3-hexanediol are heated in a reaction vessel to 180° F. with agitation. 288 parts by weight of TMA flakes are added and the mixture is heated to 250° F. with agitation to form a half-ester reaction product. The reaction time is 45 minutes. The product is a white, opaque, highly viscous material having an acid value of about 310. 317 parts by weight of Polyol Ester 4 are added to the half-ester product, after which 229 parts by weight of 4-methoxy-4-methylpentanone-2 and 229 parts by weight of butoxyethanol acetate are added.

EXAMPLE XXXVI

Using the Polyol Ester 4 and half-ester containing solution of Example XXXV an oil-modified, carboxylic group-containing urethane polymer solution is formed. Toluene diisocyanate (957 parts by weight), DMPA (335 parts by weight), TNPP (10.5 parts by weight), dibutyl tin dilaurate catalyst (0.5 part by weight), 4-methoxy-4-methylpentanone-2 (316 parts by weight) and butoxyethanol acetate (316 parts by weight) are added to a reaction vessel under inert gas. The mixture is agitated and heated to 160°–170° F. and held for several hours at this temperature until all the DMPA crystals are dissolved and reacted into solution. The mixture is cooled to 130° F. and the Polyol Ester 4 and half-ester solution from Example XXXV (743 parts by weight) is slowly added to the vessel over a one-half hour period. The resulting mixture is heated to 160°–170° F. and held for 15 minutes. The isocyanate value in the reaction mixture is 6.2%, and an additional 2282 parts by weight of Polyol Ester 4 are added over a one-half hour period. After the additional polyol ester had been completely introduced, the temperature of the reaction mixture is raised to 160°–170° F., and the reaction is continued for several hours until an isocyanate value of about 0.2% is reached. 892 parts by weight of butoxyethanol are blended into the product. The product contains 69.5% non-volatiles and has an acid value (solids) of 54, a viscosity of 125 Stokes and a Gardner color of 4+.

EXAMPLE XXXVII

An aqueous coating composition containing a dispersion of an ammonia-neutralized polymer of Example XXXVI is prepared by mixing the following ingredients in the amounts and in the order indicated.

|  | Parts by Weight |
| --- | --- |
| Polymer Solution of Example XXXVI | 108.0 |
| Butoxyethanol | 5.5 |
| Cobalt Drier (5% Co) | 0.3 |
| Manganese Drier (5% Mn) | 0.3 |
| Activ-8 | 0.15 |
| L5310 | 0.5 |
| Ammonium Hydroxide (28%) | 5.5 |
| Water | 167.75 |
|  | 288.0 |

The resulting composition has a viscosity of about 2.8 Stokes and a non-volatile content of about 26%. A 3 mil wet film of this dispersion dries to a clear, hard film in 2.3 hours and has a Sward hardness of 38 after 1 week of air drying. The composition has good storage stability under ambient or 160° F. temperature conditions.

EXAMPLE XXXVIII

A carboxylic group-containing, half-ester product, useful in preparing the urethane polymers of the present invention, is prepared from TMA and 2-methyl-2,4-pentanediol (hexylene glycol). Under an inert atmosphere, 224 parts by weight of 2-methyl-2,4-pentanediol are heated in a reaction vessel to 180° F. with agitation. 288 parts by weight of TMA flakes are added and the mixture is heated to 240° F. with agitation to form a half-ester reaction product. The product solidifies in the flask after about 15 minutes at 240° F. 209 parts by weight of 4-methoxy-4-methylpentanone-2 and 209 parts by weight of butoxyethanol acetate are carefully added and the product dissolves by heating and blending for several hours. The blended mixture is fluid at 120° to 130° F. and solidifies at room temperature.

EXAMPLE XXXIX

Using the half-ester containing solution of Example XXXVIII an oil-modified, carboxylic group-containing urethane polymer solution is formed. Toluene diisocyanate (957 parts by weight), DMPA (335 parts by weight), TNPP (10 parts by weight), dibutyl tin dilaurate catalyst (0.5 part by weight), 4-methoxy-4-methylpentanone-2 (322 parts by weight) and butoxyethanol acetate (322 parts by weight) are added to a reaction vessel under inert gas. The mixture is agitated and heated to 160°–170° F. and held for several hours at this temperature until all the DMPA crystals are dissolved and reacted into solution. A preblend of the half-ester solution of Example XXXVIII (552 parts by weight) and Polyol Ester 4 (179 parts by weight is added over a ½ hour period to the reaction vessel which has been cooled to 130° F. The mixture is heated at 160°–170° F. for 15 minutes and the NCO value is 5.1%. The mixture is cooled to 130° F., and an additional 2282 parts by weight of Polyol Ester 4 is added over a one-half hour period. After the additional polyol ester had been completely introduced, the temperature of the reaction mixture is raised to 160° to 170° F., and the reaction is continued for several hours until an isocyanate value of about 0.1% is reached.

Butoxyethanol (892 parts by weight) is added to the polymer solution, and the resinous reaction product contains 69% non-volatiles. The resulting urethane polymer solution has an acid value (solids) of 53, a viscosity of 118 Stokes and a Gardner color of 7.

EXAMPLE XXXX

An aqueous coating composition containing a dispersion of an ammonia-neutralized polymer of Example XXXIX is prepared by mixing the following ingredients in the amounts and in the order indicated.

|  | Parts by Weight |
|---|---|
| Polymer Solution of Example XXXIX | 108.7 |
| Butoxyethanol | 4.8 |
| Cobalt Drier (5% Co) | 0.3 |
| Manganese Drier (5% Mn) | 0.3 |
| *Activ-8 | 0.15 |
| **L5310 | 0.5 |
| Ammonium Hydroxide (28%) | 5.3 |
| Water | 167.95 |
|  | 288.00 |

The resulting composition is slightly hazy and has a viscosity of about 2.8 Stokes and a non-volatile content of about 26%. A 3 mil wet film of the dispersion dries to a clear, hard film in 2 hours and has a Sward hardness of 28 after one week of air drying. The composition has good storage stability under ambient or 160° F. temperature conditions.

It is claimed:

1. A carboxylic group-containing, isocyanate-terminated urethane comprising the reaction product of hydrocarbon diisocyanate and urethane-forming polyol in which a substantial amount of the reacted hydroxyl functionality is provided by a carboxylic group-containing, half-ester of anhydride of a polycarboxylic acid selected from the group consisting of aromatic carboxylic acids having at least three carboxylic acid groups and aliphatic dicarboxylic acids of 4 to 5 carbon atoms, and a diol in which the hydroxy groups are primary and secondary or tertiary, or are secondary and tertiary, and when primary and secondary, the secondary hydroxyl group is attached to at least one tertiary or quaternary carbon atom.

2. A urethane of claim 1 in which said diol is 2,2,4-trimethyl-1,3-pentanediol.

3. A urethane of claim 1 or 2 in which said anhydride comprises trimellitic anhydride.

4. A urethane of claim 3 which has an acid value of at least about 80 based on polymer solids.

5. A urethane of claim 1 or 2 in which said urethane-forming polyol is further comprised of additional polyol selected from the group consisting of dihydroxy alkanoic acids, unsaturated fatty acid ester polyols, trimethylol propane, dimethylol cyclohexane and a diol in which the hydroxy groups are primary and secondary or tertiary, or are secondary and tertiary, and when primary and secondary, the secondary hydroxy group is attached to at least one tertiary or quaternary carbon atom.

6. A urethane of claim 5 in which said anhydride comprises trimellitic anhydride.

7. A urethane of claim 6 in which said additional polyol is comprised of a dihydroxy alkanoic acid of the formula

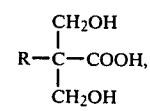

wherein R is lower alkyl or hydrogen.

8. A urethane of claim 7 in which R is methyl.

9. A urethane of claim 6 in which said additional polyol is comprised of unsaturated fatty acid ester polyol.

10. A urethane of claim 9 in which said ester polyol is comprised of a transesterification reaction product of linseed oil and pentaerythritol.

11. A urethane of claim 1 or 2 which contains a minor amount of tris-hydrocarbyl phosphite sufficient to control the drying time of coatings made therefrom.

12. A urethane of claim 11 in which said anhydride comprises trimellitic anhydride.

13. A urethane composition of claim 12 in which said phosphite comprises tris-alkylphenyl phosphite.

14. A urethane composition of claim 13 in which said amount is about 0.5 to 3 weight % based on polymer solids.

15. A urethane composition of claim 14 in which said phosphite comprises tris-nonylphenyl phosphite.

16. An oil-modified, carboxylic group-containing polymer comprising the reaction product of hydrocarbon diisocyanate and urethane-forming polyol in which at least about 10% of the reacted hydroxyl functionality is provided by unsaturated fatty acid ester polyol and at least about 5% of the reacted hydroxyl functionality is provided by carboxylic group-containing, half-ester of anhydride of a polycarboxylic acid selected from the group consisting of aromatic carboxylic acids having at least three carboxylic acid groups and aliphatic dicarboxylic acids of 4 to 5 carbon atoms, and diol in which the hydroxy groups are primary and secondary or tertiary, or are secondary and tertiary, and when primary and secondary, the secondary hydroxyl group is attached to at least one tertiary or quaternary carbon atom.

17. An oil modified polymer of claim 16 in which said diol is 2,2,4-trimethyl-1,3-pentanediol.

18. An oil-modified, carboxylic group-containing polymer of claim 16 or 17 in which said anhydride comprises trimellitic anhydride.

19. An oil-modified, carboxylic group-containing polymer of claim 16 or 17 in which said amounts of hydroxyl functionality are about 10 to 40% provided by said half-ester and about 40 to 80% provided by said unsaturated fatty acid ester polyol.

20. An oil-modified, carboxylic group-containing polymer of claim 19 in which said anhydride comprises trimellitic anhydride.

21. An oil-modified, carboxylic group-containing polymer of claim 16 or 17 in which said urethane-forming polyol is further comprised of additional polyol selected from the group consisting of dihydroxy alkanoic acids, trimethylol propane, dimethylol cyclohexane and diol in which the hydroxy groups are primary and secondary or tertiary, or are secondary and tertiary, and when primary and secondary, the secondary hydroxyl group is attached to at least one tertiary or quaternary carbon atom.

22. An oil-modified, carboxylic group-containing polymer of claim 21 in which said anhydride comprises trimellitic anhydride.

23. An oil-modified, carboxylic group-containing polymer of claim 22 in which said additional polyol is comprised of 2,2-dimethylol propionic acid.

24. An oil-modified, carboxylic group-containing polymer of claim 16 or 17 in which said unsaturated fatty acid ester polyol is comprised of a transesterification reaction product of linseed oil and pentaerythritol.

25. An oil-modified, carboxylic group-containing polymer of claim 24 in which said anhydride comprises trimellitic anhydride.

26. A solvent solution of an oil-modified, carboxylic group-containing polymer of claim 16 or 17 in which the solvent is comprised of alkanol or alkoxyalkanol.

27. A solvent solution of claim 26 in which said anhydride comprises trimellitic anhydride.

28. A solvent solution of claim 27 in which the solvent is comprised of butoxyethanol.

29. A solvent solution of claim 28 in which said amounts of hydroxyl functionality are about 10 to 40% provided by said half-ester and about 40 to 80% provided by said unsaturated fatty acid ester polyol.

30. A solvent solution of claim 29 in which said urethane-forming polyol is further comprised of additional polyol selected from the group consisting of dihydroxy alkanoic acids, trimethylol propane, dimethylol cyclohexane and diol in which the hydroxy groups are primary and secondary or tertiary, or are secondary and tertiary, and when primary and secondary, the secondary hydroxyl group is attached to at least one tertiary or quaternary carbon atom.

31. A solvent solution of claim 30 in which said diol is 2,2,4-trimethyl-1,3-pentanediol.

32. An oil-modified, carboxylic group-containing polymer of claim 16 or 17 which has an acid value of about 40 to 75 based on polymer solids.

33. An oil-modified, carboxylic group-containing polymer of claim 32 in which said anhydride comprises trimellitic anhydride.

34. A solvent solution of an oil-modified, carboxylic group-containing polymer of claim 33 in which the solvent is comprised of alkanol or alkoxyalkanol.

35. A solvent solution of claim 34 in which the solvent is comprised of butoxyethanol.

36. A solvent solution of claim 35 in which said amounts of hydroxyl functionality are about 10 to 40% provided by said half-ester and about 40 to 80% provided by said unsaturated fatty acid ester polyol.

37. A solvent solution of claim 36 in which said urethane-forming polyol is further comprised of additional polyol selected from the group consisting of dihydroxy alkanoic acids, trimethylol propane, dimethylol cyclohexane and 2,2,4-trimethyl-1,3-pentanediol.

38. A solvent solution of claim 37 in which said additional polyol is 2,2-dimethylol propionic acid.

39. A solvent solution of claim 38 in which said unsaturated fatty acid ester polyol is comprised of a transesterification reaction product of linseed oil and pentaerythritol.

40. An oil-modified, carboxylic group-containing urethane polymer comprising the reaction product of an isocyanate-terminated prepolymer of hydrocarbon diisocyanate and urethane-forming polyol comprising carboxylic group-containing, half-ester of anhydride of polycarboxylic acid selected from the group consisting of aromatic carboxylic acids having at least three carboxylic acid groups and aliphatic dicarboxylic acids of 4 to 5 carbon atoms, and diol in which the hydroxy groups are primary and secondary or tertiary, or are secondary and tertiary, and when primary and secondary, the secondary hydroxyl group is attached to at least one tertiary or quaternary carbon atom, said prepolymer being oil-modified with unsaturated fatty acid ester polyol, in which said oil-modified urethane polymer at least about 5% of the reacted hydroxyl functionality is provided by said half-ester and at least about 10% of the reacted hydroxyl functionality is provided by unsaturated fatty acid ester polyol.

41. An oil-modified polymer of claim 40 in which said diol is 2,2,4-trimethyl-1,3-pentanediol.

42. An oil-modified, carboxylic group-containing polymer of claim 40 or 41 in which said anhydride is trimellitic anhydride.

43. An oil-modified, carboxylic group-containing polymer of claim 42 in which said amounts of hydroxyl functionality are about 10 to 40% provided by said half-ester and about 40 to 80% provided by said unsaturated fatty acid ester polyol.

44. An oil-modified, carboxylic group-containing polymer of claim 43 in which said urethane-forming polyol is further comprised of 2,2-dimethyl propionic acid.

45. An oil-modified, carboxylic group-containing polymer of claim 44 in which said unsaturated fatty acid ester polyol is comprised of a transesterification reaction product of linseed oil and pentaerythritol.

46. An oil-modified, carboxylic group-containing urethane polymer of claim 42 in which a minor amount of the unsaturated fatty acid ester polyol is provided as part of said prepolymer.

47. An oil-modified, carboxylic group-containing polymer of claim 46 in which said urethane-forming polyol is further comprised of 2,2-dimethyl propionic acid.

48. An oil-modified, carboxylic group-containing polymer of claim 47 in which said unsaturated fatty acid ester polyol is comprised of a transesterification reaction product of linseed oil and pentaerythritol.

49. An oil-modified, carboxylic group-containing urethane polymer of claim 16, 17, 40 or 41 which contains a minor amount of tris-hydrocarbyl phosphite sufficient to control the drying time of coatings made therefrom.

50. A urethane polymer of claim 49 in which said diol is 2,2,4-trimethyl-1,3-pentanediol.

51. A urethane polymer of claim 50 in which said anhydride comprises trimellitic anhydride.

52. A urethane composition of claim 51 in which said phosphite comprises tris-alkylphenyl phosphite.

53. A urethane composition of claim 52 in which said tris-alkylphenyl phosphite is comprised of tris-nonylphenyl phosphite.

54. A urethane composition of claim 52 in which said amount is about 0.5 to 3 weight % based on polymer solids.

55. An aqueous dispersion of a quaternary ammonium salt of ammonia or amine and an oil-modified, carboxylic group-containing urethane polymer composition of the oil-modified polymer of claim 16, 17, 40, or 41.

56. An aqueous dispersion of claim 55 in which said diol is 2,2,4-trimethyl-1,3-pentanediol.

57. An aqueous dispersion of claim 56 in which said anhydride comprises trimellitic anhydride.

58. An aqueous dispersion of claim 57 in which said salt comprises a salt of ammonia.

59. An aqueous dispersion of claim 58 in which the amount of carboxylic group in salt form is about 3 to 6% of said dispersion on a solids basis.

60. An aqueous dispersion of claim 57 in which in said polymer the amounts of said hydroxyl functionality provided by said half-ester is about 10 to 40% and by said unsaturated fatty acid ester polyol is about 40 to 80%.

61. An aqueous dispersion of claim 60 in which in said polymer a portion of said hydroxyl functionality is provided by 2,2-dimethylol propionic acid.

62. An aqueous dispersion of claim 57 in which a solvent comprised of alkanol or alkoxyalkanol is present.

63. An aqueous dispersion of claim 62 in which the solvent is comprised of butoxyethanol.

64. An aqueous dispersion of claim 63 in which said salt comprises a salt of ammonia.

* * * * *